US011992923B2

(12) United States Patent
Moore et al.

(10) Patent No.: US 11,992,923 B2
(45) Date of Patent: May 28, 2024

(54) FASTENER-DRIVING TOOL INCLUDING A REVERSION TRIGGER

(71) Applicant: Illinois Tool Works Inc., Glenview, IL (US)

(72) Inventors: Stephen P. Moore, Palatine, IL (US); Murray Z. Weinger, Johnsburg, IL (US); Daniel J. Birk, McHenry, IL (US); Hanxin Zhao, Northbrook, IL (US); Ricardo Segura, Lake in the Hills, IL (US); Ryan L Francis, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/859,767

(22) Filed: Jul. 7, 2022

(65) Prior Publication Data

US 2022/0339766 A1 Oct. 27, 2022

Related U.S. Application Data

(63) Continuation of application No. 17/166,142, filed on Feb. 3, 2021, now Pat. No. 11,396,095, which is a (Continued)

(51) Int. Cl.
*B25C 1/00* (2006.01)
*B25C 1/04* (2006.01)

(52) U.S. Cl.
CPC .............. *B25C 1/008* (2013.01); *B25C 1/043* (2013.01); *B25C 1/047* (2013.01)

(58) Field of Classification Search
CPC ........... B25C 1/047; B25C 1/04; B25C 1/043; B25C 1/008

(Continued)

(56) References Cited

U.S. PATENT DOCUMENTS 3,786,978 A 1/1974 Manganaro
3,964,659 A 6/1976 Eiben et al.
(Continued)

FOREIGN PATENT DOCUMENTS

EP 2450152 9/2012

OTHER PUBLICATIONS

International Search Report and Written Opinion for International Application No. PCT/US2014/053022, dated Oct. 30, 2014 (11 pages).

*Primary Examiner* — Thomas M Wittenschlaeger
*Assistant Examiner* — Katie L Gerth
(74) *Attorney, Agent, or Firm* — Neal, Gerber & Eisenberg LLP

(57) ABSTRACT

A fastener-driving tool includes a housing and a workpiece-contacting element movable between a rest position and an activated position. The tool also includes a trigger connected to the housing and movable between a rest position and an activated position, a control valve including an actuating pin, an actuation lever movably connected to the trigger and movable between a rest position and an actuating position adjacent to the actuating pin, and a trigger control mechanism associated with the actuation lever and configured for moving and holding the actuation lever in the actuating position. In a powered mode, the trigger control mechanism causes the-actuation lever to move and remain in the actuating position such that the tool is actuated each time the workpiece-contacting element contacts a workpiece and moves to the activated position causing the actuation lever to contact the actuating pin and initiate an actuation of the tool.

17 Claims, 17 Drawing Sheets

Related U.S. Application Data continuation of application No. 16/280,657, filed on Feb. 20, 2019, now Pat. No. 10,926,387, which is a continuation of application No. 15/411,651, filed on Jan. 20, 2017, now Pat. No. 10,213,911, which is a continuation of application No. 14/049,339, filed on Oct. 9, 2013, now Pat. No. 9,550,288, which is a continuation-in-part of application No. 13/657,415, filed on Oct. 22, 2012, now Pat. No. 9,381,633.

(58) Field of Classification Search
USPC ............................................................ 227/8
See application file for complete search history.

(56) References Cited

U.S. PATENT DOCUMENTS

| | | | | |
|---|---|---|---|---|
| 4,351,464 | A | 9/1982 | Fehrs | |
| 4,679,719 | A | 7/1987 | Kramer | |
| 5,551,620 | A | 9/1996 | Vallee | |
| 5,605,268 | A | 2/1997 | Hayashi et al. | |
| 5,732,870 | A | 3/1998 | Moorman et al. | |
| 5,772,096 | A | 6/1998 | Osuka et al. | |
| 5,862,969 | A | 1/1999 | Lee | |
| 5,918,788 | A | 7/1999 | Moorman et al. | |
| 6,213,372 | B1 | 4/2001 | Chen | |
| 6,357,647 | B1 * | 3/2002 | Ou | B25C 1/008 227/8 |
| 6,382,492 | B1 | 5/2002 | Moorman et al. | |
| 6,431,425 | B1 | 8/2002 | Moorman et al. | |
| 6,450,387 | B1 | 9/2002 | Chen | |
| 6,543,664 | B2 | 4/2003 | Wolfberg | |
| 6,604,664 | B2 | 8/2003 | Robinson | |
| 6,691,907 | B1 * | 2/2004 | Chang | B25C 1/008 227/8 |
| 6,695,193 | B1 * | 2/2004 | Chang | B25C 1/043 227/8 |
| 6,695,194 | B1 | 2/2004 | Chang | |
| 7,143,918 | B2 | 12/2006 | Aguirre et al. | |
| 7,163,134 | B2 | 1/2007 | Moeller et al. | |
| 7,469,818 | B2 | 12/2008 | Saltsor et al. | |
| 7,510,105 | B2 | 3/2009 | Moeller et al. | |
| 7,513,402 | B2 | 4/2009 | Miyashita | |
| 7,828,072 | B2 | 11/2010 | Hashimoto et al. | |
| 7,971,766 | B2 | 7/2011 | Tang | |
| 7,975,890 | B2 | 7/2011 | Tang | |
| 8,011,441 | B2 | 9/2011 | Petrocelli | |
| 8,313,012 | B2 | 11/2012 | Shima et al. | |
| 8,336,749 | B2 | 12/2012 | Largo | |
| 8,348,118 | B2 | 1/2013 | Segura | |
| 8,505,798 | B2 * | 8/2013 | Simonelli | B25F 5/02 227/126 |
| 9,061,407 | B2 | 6/2015 | Chien et al. | |
| 9,242,359 | B2 | 1/2016 | Staples | |
| 2011/0005502 | A1 * | 1/2011 | Adams | B25C 1/08 123/559.1 |
| 2012/0097730 | A1 | 4/2012 | Liang et al. | |
| 2012/0104070 | A1 | 5/2012 | Wu et al. | |

* cited by examiner

FASTENER-DRIVING TOOL INCLUDING A REVERSION TRIGGER

PRIORITY CLAIM

This patent application is a continuation of and claims priority to and the benefit of U.S. patent application Ser. No. 17/166,142, which was filed on Feb. 3, 2021, which is a continuation of and claims priority to and the benefit of U.S. patent application Ser. No. 16/280,657, which was filed on Feb. 20, 2019, and issued as U.S. Pat. No. 10,926,387 on Feb. 23, 2021, which is a continuation of and claims priority to and the benefit of U.S. patent application Ser. No. 15/411,651, which was filed on Jan. 20, 2017, and issued as U.S. Pat. No. 10,213,911 on Feb. 26, 2019, which is a continuation of and claims priority to and the benefit of U.S. patent application Ser. No. 14/049,339, which was filed on Oct. 9, 2013, and issued as U.S. Pat. No. 9,550,288 on Jan. 24, 2017, which is a continuation-in-part of and claims priority to and the benefit of U.S. patent application Ser. No. 13/657,415, which was filed on Oct. 22, 2012, and issued as U.S. Pat. No. 9,381,633 on Jul. 5, 2016, the entire contents of each of which are incorporated herein by reference.

BACKGROUND

The present disclosure relates generally to powered, fastener-driving tools, wherein the tools may be electrically powered, pneumatically powered, combustion powered, or powder activated, and more particularly to a new and improved fastener-driving tool having a trigger control mechanism that is capable of providing multiple actuation modes without the need to manually adjust the tool.

Powered, fastener-driving tools, of the type used to drive various fasteners, such as, for example, staples, nails, and the like, typically comprise a housing, a power source, a supply of fasteners, a trigger mechanism for initiating the actuation of the tool, and a workpiece-contacting element (also referred to herein as a "work contact element" or "WCE"). The workpiece-contacting element is adapted to engage or contact a workpiece, and is operatively connected to the trigger mechanism, such that when the workpiece-contacting element is in fact disposed in contact with the workpiece, and depressed or moved inwardly a predetermined amount with respect to the tool, as a result of the tool being pressed against or moved toward the workpiece a predetermined amount, the trigger mechanism will in fact be enabled so as to initiate actuation of the fastener-driving tool.

As is well-known in the art, powered, fastener-driving tools normally have two kinds or types of operational modes, and the tool is accordingly provided with some mechanism, such as, for example, a lever, a latch, a switch, or the like, for enabling the operator to optionally select the one of the two types or kinds of operational modes that the operator desires to use for installing the fasteners. More particularly, in accordance with a first one of the two types or kinds of modes of operating the powered, fastener-driving tool, known in the industry and art as the sequential or single-actuation mode of operation, the depression or actuation of the trigger mechanism will not in fact initiate the actuation of the tool and the driving of a fastener into the workpiece unless the workpiece-contacting element is initially depressed against the workpiece. Considered from a different point of view or perspective, in order to operate the powered, fastener-driving tool in accordance with the sequential or single-actuation mode of operation, the workpiece-contacting element must first be depressed against the workpiece followed by the depression or actuation of the trigger mechanism. Still further, once the particular fastener has in fact been driven into the workpiece, further or repeated depression or actuation of the trigger mechanism will not result in the subsequent driving of additional fasteners into the workpiece unless, and until, the workpiece-contacting element is permitted to effectively be reset to its original position and once again disposed in contact with, and pressed against, the workpiece prior to the depression or actuation of the trigger mechanism each time the tool is to be actuated so as to drive a fastener into the workpiece.

Alternatively, in accordance with a second one of the two types or kinds of modes of operating the powered, fastener-driving tool, known in the industry and art as the contact actuation mode of operation, the operator can in fact maintain the trigger mechanism at its depressed position, and subsequently, each time the workpiece-contacting element is disposed in contact with, and pressed against, the workpiece, the tool will actuate, thereby driving a fastener into the workpiece.

Continuing further, trigger assemblies are known wherein mechanisms are provided upon, or incorporated within, the trigger assemblies of the fastener-driving tools for permitting the operator to optionally select the particular one of the two types or kinds of modes of operating the powered, fastener-driving tool that the operator desires to implement in order to drive fasteners into the workpiece in a predetermined manner so as to achieve predetermined fastening procedures. One such trigger assembly is disclosed, for example, within U.S. Pat. No. 6,543,664, which issued to Wolfberg on Apr. 8, 2003 (hereinafter referred to as "Wolfberg"). In accordance with the disclosed control system of Wolfberg, and with reference being made to FIG. 1 of the present application which substantially corresponds to FIG. 3 of Wolfberg, the trigger assembly is disclosed at 16 and is seen to comprise a trigger 18 which includes a pair of spaced apart side walls 20 between which there is interposed a finger contact portion 22. The side walls 20 and the finger contact portion 22 effectively define an inner cavity 30 that is open at the upper end portion 32 thereof, and an actuation lever 34 is disposed within the inner cavity 30. The actuation lever 34 is pivotally mounted within the inner cavity 30 by means of an end portion 38 thereof, which comprises an eyelet or throughbore 40 within which there is disposed a pivot pin 42, and the actuation lever 34 also comprises a free distal end portion 36. An upper corner portion of each one of the side walls 20 is provided with an eyelet or throughbore 26 within which a pivot pin 28 is disposed, and in this manner, the entire trigger assembly 16 is pivotally mounted upon the tool housing 12.

It is further seen that the pair of side walls 20 are provided with a pair of notches 46,48 within which the pivotal end portion 38 of the actuation lever 34 can be selectively disposed such that the operator can operationally choose which mode of operation the fastener-driving tool will perform, that is, either the sequential actuation mode of operation or the contact actuation mode of operation, and it is seen still further that the fastener-driving tool also comprises a workpiece-contacting element 44. As a result of the pivotal end portion 38 of the actuation lever 34 being disposed within either one of the two positions determined by means of the pair of notches 46, 48, the free distal end portion 36 of the actuation lever 34 may be disposed relatively closer to, or farther from, a trigger end portion 60 of the workpiece-contacting element 44. More particularly, when the actuation lever 34 is disposed relatively further away from the trigger end portion 60 of the workpiece-contacting element 44, the fastener-driving tool will be disposed in its sequential actuation mode of operation, whereas when the actuation lever 34 is disposed relatively closer to the trigger end portion 60 of the workpiece-contacting element 44, the fastener-driving tool will be disposed in its contact actuation mode of operation. It is seen still further that the fastener-driving tool further comprises a control valve 52 which initiates actuation of the fastener-driving tool, whereby a fastener is driven outwardly from the fastener-driving tool and into the workpiece, and that a coiled spring 54 circumscribes the control valve 52 so as to be interposed between the tool housing 12 and an upper surface portion 56 of the actuation lever 34. In this manner, the actuation lever 34 is effectively biased toward the finger contact portion 22 of the trigger 18 such that the pivot pin 42 of the pivotal end portion 38 of the actuation lever 34 is assuredly seated within one of the notches 46, 48. It is further appreciated that the workpiece-contacting element 44 comprises a plurality of linkage members 62 which effectively integrally interconnect the actual workpiece-contacting member 64 with the trigger end portion 60 thereof.

In order to appreciate the achievement, for example, of the sequential actuation of the fastener-driving tool, reference is made to FIGS. 1 and 2 of the present application, which substantially correspond to FIGS. 3 and 4 of Wolfberg. More particularly, in order to actuate the fastener-driving tool, and thereby eject a fastener from the fastener-driving tool and into a workpiece, the free distal end portion 36 of the actuation lever 34 must be disposed within the vicinity of the trigger end portion 60 of the workpiece-contacting element 44 such that the actuation lever 34 can in fact be moved upwardly toward the control valve 52, by means of the trigger end portion 60 of the workpiece-contacting element 44, when the workpiece-contacting element 44 is depressed into contact with the workpiece, so as to be ready to be subsequently moved upwardly into contact with the control valve 52 by means of the finger contact portion 22 of the trigger 18 when the finger contact portion 22 of the trigger 18 is in fact depressed or moved upwardly. Accordingly, when in fact a sequential actuation mode of operation of the fastener-driving tool is to be performed, the operator will dispose the workpiece-contacting member 64 of the workpiece-contacting element 44 into contact with the workpiece, and subsequently, the operator will effectively move the fastener-driving tool downwardly, or toward the workpiece, causing the workpiece-contacting element 44 to effectively move upwardly relative to the tool housing 12.

As a result of such relative upward movement of the workpiece-contacting element 44, the trigger end portion 60 of the workpiece-contacting element 44 will engage the free distal end portion 36 of the actuation lever 34 so as to move the actuation lever 34 upwardly toward the control valve 52. Subsequently, when the finger contact portion 22 of the trigger 18 is depressed or moved upwardly with respect to the tool housing 12, the entire trigger assembly 16 will be pivotally moved around the pivot pin 28 such that the actuation lever 34 can now in fact contact and actuate the control valve 52 whereby actuation of the fastener-driving tool, as a result of which a fastener is ejected from the fastener-driving tool and into the workpiece, occurs. It is to be additionally noted, however, that as a result of the aforenoted pivotal movement of the entire trigger assembly 16 around the pivot pin 28 in accordance with the depression or upward movement of the finger contact portion 22 of the trigger 18 relative to the tool housing 12, the free distal end portion 36 of the actuation lever 34 will also move slightly toward the right relative to the vertically oriented linear path of movement of the trigger end portion 60 of the workpiece-contacting element 44, as can be appreciated from a comparison of the relative disposition of the free distal end portion 36 of the actuation lever 34, during both the non-actuated or non-depressed, and the actuated or depressed, states of the finger contact portion 22 of the trigger 18 as respectively illustrated within FIGS. 1 and 2 of present application.

Accordingly, if the operator maintains the finger contact portion 22 of the trigger 18 at its depressed or upwardly moved, pivotal position relative to the tool housing 12, then when the operator removes the fastener-driving tool from its contact or depressed state with respect to the workpiece, in order to, for example, move the fastener-driving tool to a new or other location, relative to the workpiece, at which another fastener is to be driven into the workpiece, the workpiece-contacting element 44 will be moved downwardly, under the biasing influence of its spring-biasing means, not illustrated, such that the trigger end portion 60 of the workpiece-contacting element 44 will effectively be released or disengaged from the free distal end portion 36 of the actuation lever 34. Therefore, the actuation lever 34 will, in turn, move downwardly away from the control valve 52, under the biasing influence of the coil spring 54, so as to attain the position illustrated within FIG. 2 of the present application wherein it is noted that the free distal end portion 36 of the actuation lever 34 is in fact removed from the vertically oriented linear path of movement of the trigger end portion 60 of the workpiece-contacting element 44. Accordingly, if the operator then depresses the workpiece-contacting element 44 into contact with the workpiece at the new location at which the next fastener is to be driven into the workpiece, the relative upward movement of the workpiece-contacting element 44 will not result in the trigger end portion 60 of the workpiece-contacting element 44 engaging the free distal end portion 36 of the actuation lever 34, but to the contrary, will effectively bypass the same, whereby the actuation lever 34 will not be capable of actuating the control valve 52 so as to initiate a new actuation cycle within the fastener-driving tool.

It is to be additionally appreciated that this mode of operation, or failure of operation, will also occur if, subsequent to the successful actuation of the fastener-driving tool, the finger contact portion 22 of the trigger 18 is in fact released back to its non-depressed state or position as illustrated within FIG. 1 of the present application, the workpiece-contacting element 44 is released from its depressed state or position with respect to the workpiece whereby the workpiece-contacting element 44 will effectively move vertically downwardly, and prior to the disposition of the workpiece-contacting element 44 in a depressed engaged state with respect to a new site of the workpiece at which a new fastener is to be driven into the workpiece, the finger contact portion 22 of the trigger 18 is again depressed or moved upwardly with respect to the tool housing 12. In other words, in accordance with the sequential actuation mode of operation, the workpiece-contacting element 44 must always be moved into depressed contact engagement with a portion of the workpiece prior to the depression or upward movement of the finger contact portion 22 of the trigger 18 with respect to the tool housing 12.

Alternatively, as can best be appreciated from FIGS. 3 and 4 of present application, which substantially correspond to FIGS. 5 and 6 of Wolfberg, when the fastener-driving tool is desired to be operated in accordance with the contact actuation mode of operation, it is noted that the actuation lever 34 is initially moved toward the left such that the pivotal end portion 38 of the actuation lever 34 is now disposed within the notch 46 whereby the free distal end portion 36 of the actuation lever 34 is disposed closer to the trigger end portion 60 of the workpiece-contacting element 44. This movement of the actuation lever 34 may be achieved by inserting a pointed object, such as, for example, a nail, or the like, into one end of the pivot pin 42 of the pivotal end portion 38 of the actuation lever 34, the pivot pin 42 comprising a hollow tubular structure or having recessed means formed within an end portion thereof for accommodating the nail or the like. As illustrated in FIG. 3 of the present application, all components are disposed at their normal static positions, that is, the workpiece-contacting element 44 has not yet been depressed against the workpiece so as not to as yet have been moved upwardly with respect to the tool housing 12, and the finger contact portion 22 of the trigger 18 has likewise not as yet been depressed or moved upwardly.

Accordingly, with the component parts disposed at their relative positions illustrated within FIG. 3 of the present application, if the workpiece-contacting element 44 is initially depressed into contact with a workpiece and is accordingly moved upwardly with respect to the tool housing 12, and if the finger contact portion 22 of the trigger 18 is subsequently depressed or moved upwardly with respect to the tool housing 12, then the actuation mode of operation is substantially the same as that previously described in connection with the sequential actuation mode of operation. However, it is to be noted that once a fastener-driving tool actuation and fastener driving cycle has been completed, and another fastener-driving tool actuation and fastener driving cycle is to be implemented so as to eject another fastener out from the fastener-driving tool and drive the same into the workpiece, if the finger contact portion 22 of the trigger 18 is maintained at its depressed or upward position, as illustrated within FIG. 4 of the present application, and if the workpiece-contacting element 44 has been removed from its depressed contact engagement state with respect to the workpiece such that the workpiece-contacting element 44 has been moved downwardly relative to the tool housing 12 under the influence of its spring biasing means, not shown, the free distal end portion 36 of the actuation lever 34 will still remain disposed within the vertically oriented linear path of movement of the trigger end portion 60 of the workpiece-contacting element 44 due to the previously noted relative leftward disposition of the actuation lever 34 as a result of the location of the pivotal end portion 38 of the actuation lever 34 within the notch 46. Accordingly, unlike the sequential actuation mode of operation, when the workpiece-contacting element 44 is again disposed in a depressed state against the workpiece, the trigger end portion 60 of the workpiece-contacting element 44 can once again move the actuation lever 34 into engagement with the control valve 52 so as to in fact initiate a new actuation mode or cycle within the fastener-driving tool. Therefore, relatively rapid actuation of the fastener-driving tool in accordance with the contact actuation mode of operation can be achieved each time the workpiece-contacting element is disposed in depressed contact against a workpiece.

While it can be appreciated that the aforenoted system of Wolfberg can successfully enable the fastener-driving tool to achieve both sequential and contact actuation modes of operation by altering the disposition of the actuation lever 34 with respect to the trigger end portion 60 of the workpiece-contacting element 44, it has been noted that sometimes it is difficult to manually manipulate the pivot pin 42 so as to effectively move the pivotal end portion 38 of the actuation lever 34 from one of the notches 46,48 to the other one of the notches 46,48 in order to effectively change-over or alter the actuation mode of operation of the fastener-driving tool. As has been noted, in order to achieve such an alteration in the actuation mode of operation of the fastener-driving tool, a nail or similarly sharp-pointed object must be inserted into at least one of the hollow or recessed ends of the pivot pin 42, and in addition, the pivotal end portion 38 of the actuation lever 34 must be disengaged from one of the notches 46,48, against the biasing force of coiled spring 54, so as to permit the pivot pin 42 to then be inserted into the other one of the notches 46,48.

Experienced carpenters typically use a sequentially actuated tool for precision nailing and a contact actuated tool for non-precision nailing, such as roofing and decking. A need therefore exists for a fastener-driving tool that is readily, quickly and easily manipulated to be alternately operable between a contact actuation mode and a sequential actuation mode.

SUMMARY

Various embodiments of present disclosure provide a new and improved fastener-driving tool which has a trigger control mechanism for alternatively permitting contact actuation and sequential actuation modes of operation without manual adjustment of the tool.

In an embodiment, the present disclosure provides a fastener-driving tool including a housing and a workpiece-contacting element movably connected to the housing, where the workpiece-contacting element is movable between a rest position and an activated position. The tool also includes a trigger movably connected to the housing, where the trigger is movable between a rest position and an activated position, a control valve including an actuating pin and an actuation lever movably connected to the trigger, where the actuation lever is movable between a rest position and an actuating position adjacent to the actuating pin, and a trigger control mechanism associated with the actuation lever and configured for moving and holding the actuation lever in the actuating position. In a powered mode, the trigger control mechanism causes the-actuation lever to move and remain in the actuating position such that the tool is actuated each time the workpiece-contacting element contacts a workpiece and moves to the activated position causing the actuation lever to contact the actuating pin and initiate an actuation of the tool. In a non-powered mode, the actuation lever does not move to the actuating position such that the tool is actuated each time the workpiece-contacting element and the trigger are each respectively moved from the rest position to the activated position in a designated sequence.

Another embodiment of the present disclosure provides a fastener-driving tool including a housing and a trigger movably connected to the housing, where the trigger is movable between a rest position and an activated position. The tool further includes a control valve including an actuating pin, an actuation lever movably connected to the trigger, where the actuation lever is movable between a rest position and an actuating position adjacent to the actuating pin, and a workpiece-contacting element movably connected to the housing and being movable between a rest position and an activated position. In this embodiment, the workpiece-contacting element includes a fixed portion and an end portion movably connected to the fixed portion where the end portion is movable between a first position and a second position. In the first position, the fixed portion and the end portion are generally aligned with each other and the end portion is not configured to contact the actuation lever when the trigger is in the activated position and the workpiece-contacting element is moved to the activated position. In the second position, the end portion is at a designated angle relative to the fixed portion and is configured to contact the actuation lever when the trigger is in the activated position and the workpiece-contacting element is moved to the activated position. When the tool is in a powered mode, the end portion moves to the second position such that the tool is actuated each time the workpiece-contacting element contacts a workpiece and moves to the activated position causing the end portion to contact the actuation lever and the actuation lever to contact the actuating pin and initiate an actuation of the tool. When the tool is in a non-powered mode, the end portion is in the first position such that the tool is actuated each time the workpiece-contacting element and the trigger are each respectively moved from the rest position to the activated position in a designated sequence.

DETAILED DESCRIPTION

Figure 1:
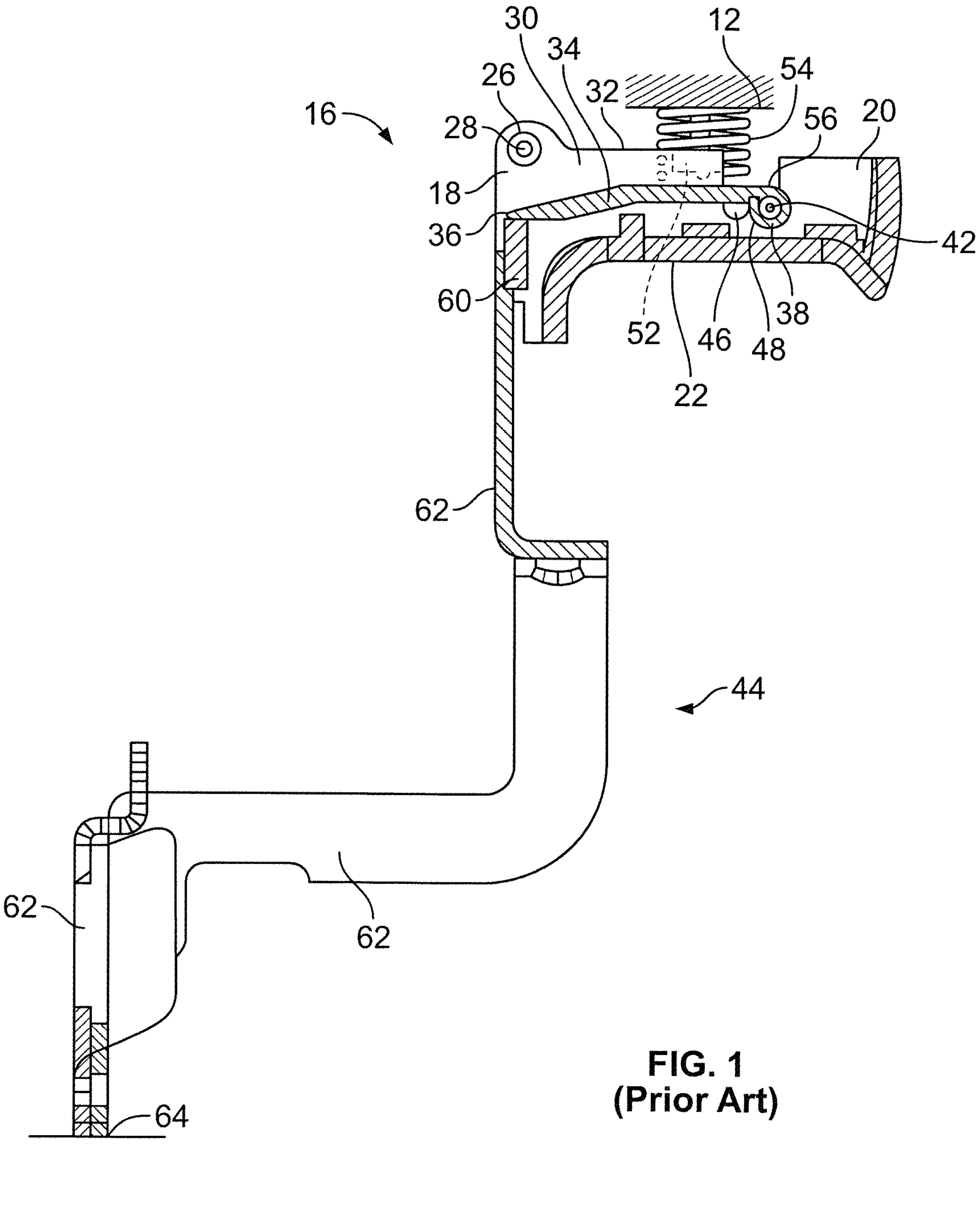
FIG. 1 (Prior Art)
FIG. 1 is a cross-sectional view of an example conventional, trigger control mechanism for a fastener-driving tool in accordance with an embodiment of the present disclosure, wherein the actuation lever is positioned upon the trigger assembly at its sequential actuation mode position, the workpiece-contacting element has been depressed against the workpiece, but the finger contact portion of the trigger has not yet been depressed or moved upwardly.
Figure 2:
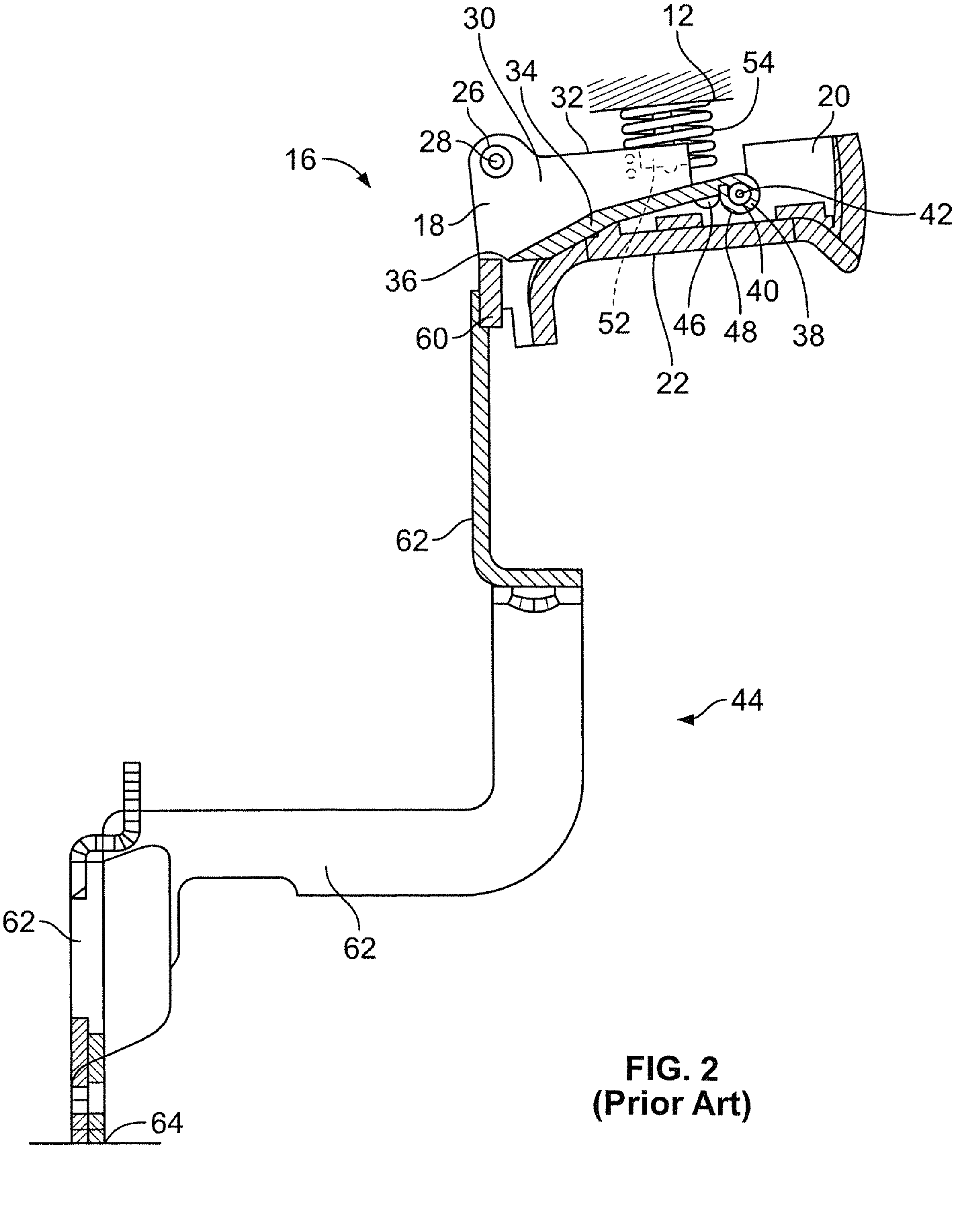
FIG. 2 (Prior Art)
FIG. 2 is a cross-sectional view of the conventional, trigger control mechanism for the fastener-driving tool of FIG. 1, wherein the actuation lever is positioned upon the trigger assembly at its sequential actuation mode position, the workpiece-contacting element has been removed from its depressed state against the workpiece, and the finger contact portion of the trigger has been depressed or moved upwardly.
Figure 3:
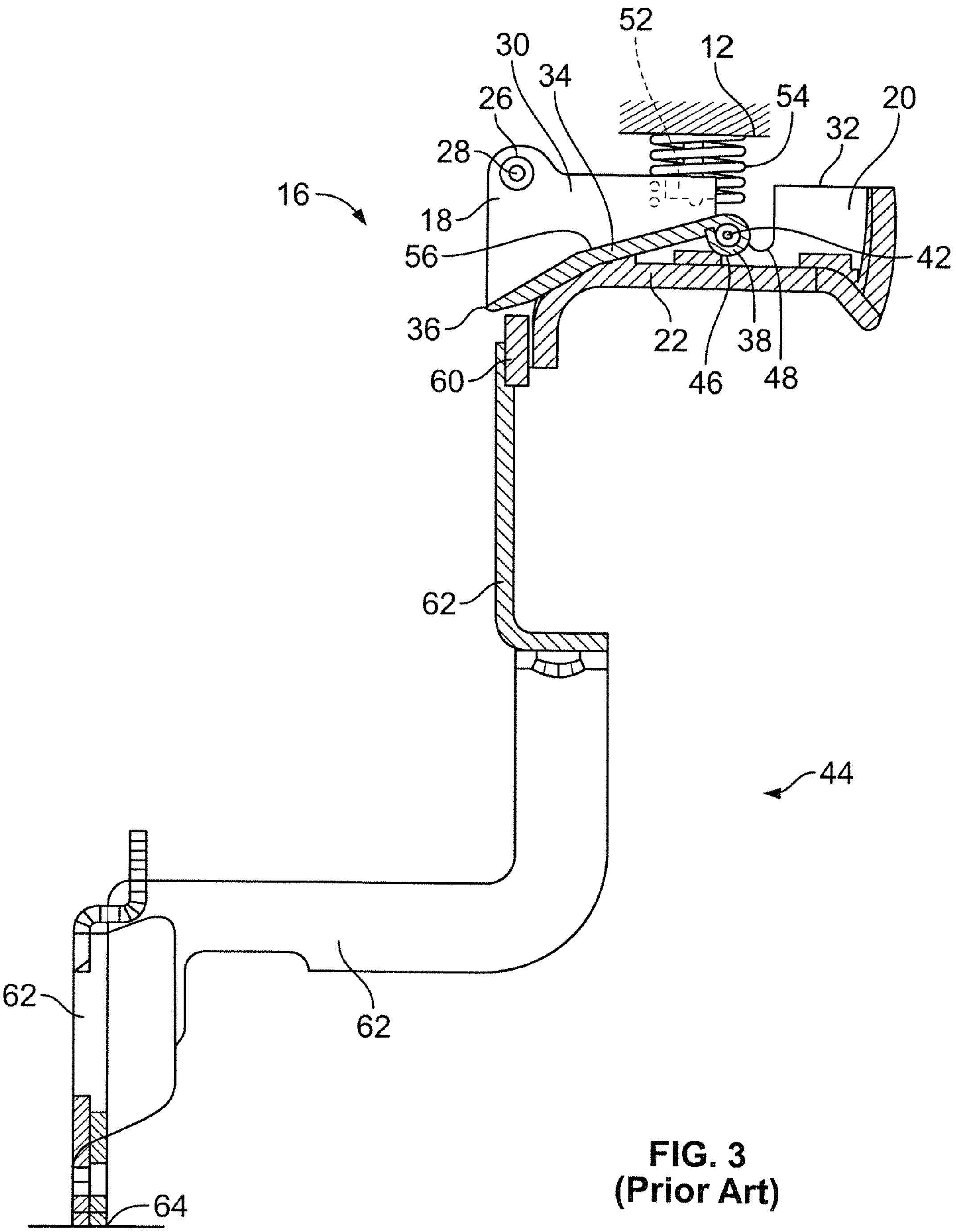
FIG. 3 (Prior Art)
FIG. 3 is a cross-sectional view of the conventional, trigger control mechanism for the fastener-driving tool of FIGS. 1 and 2, wherein, the actuation lever is positioned upon the trigger assembly at its contact actuation mode position, the workpiece-contacting element has not as yet been depressed against the workpiece, and the finger contact portion of the trigger has not as yet been depressed or moved upwardly.
Figure 4:
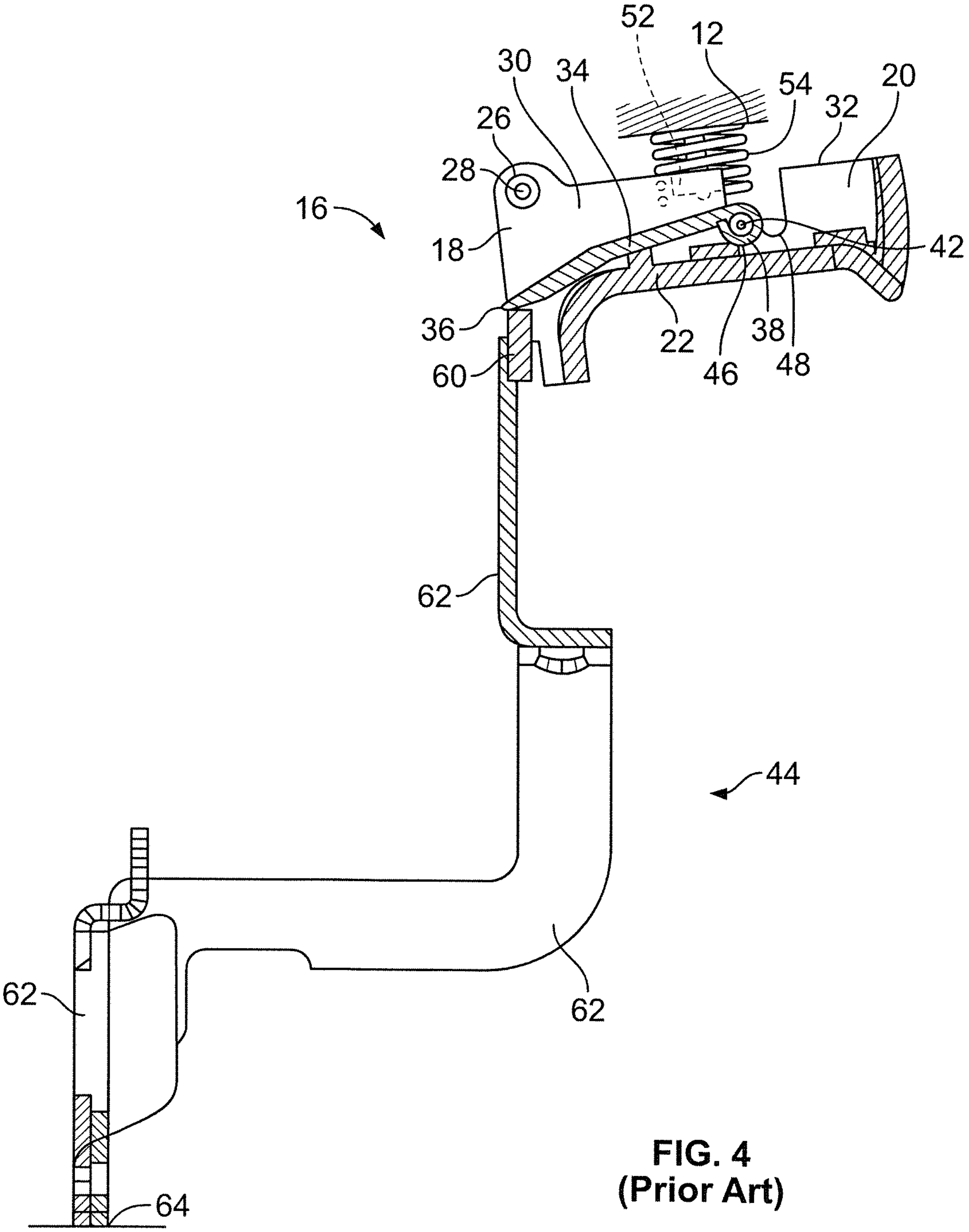
FIG. 4 (Prior Art)
FIG. 4 is a cross-sectional view of the conventional, trigger control mechanism for the fastener-driving tool of FIG. 3, wherein the actuation lever is positioned upon the trigger assembly at its contact actuation mode position, the workpiece-contacting element has been depressed against the workpiece, and the finger contact portion of the trigger has been depressed or moved upwardly.
Figure 5:
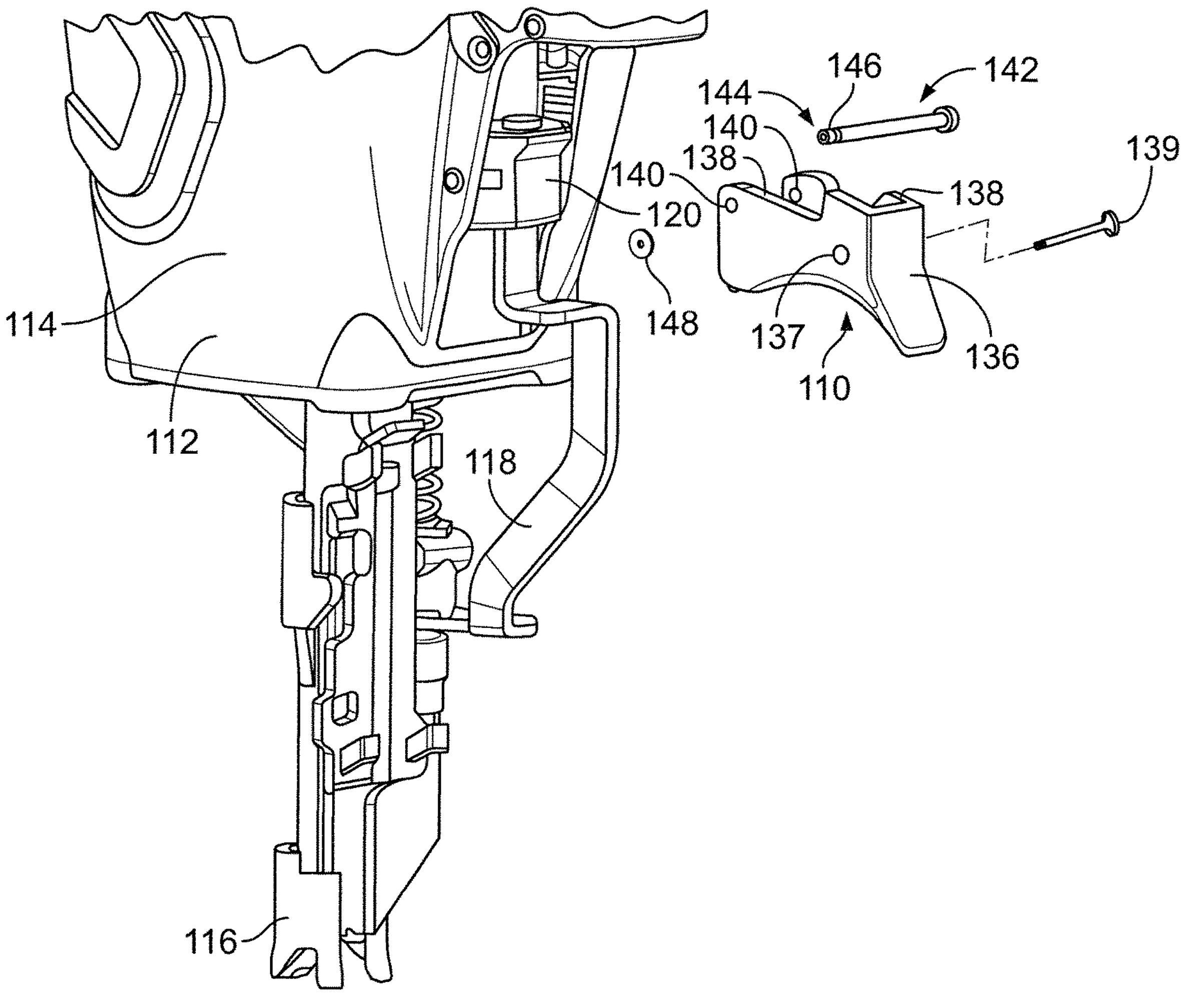
FIG. 5 is a perspective, partially exploded view of an example fastener-driving tool having another trigger control mechanism.

Referring now to FIGS. 5-11, a trigger control mechanism or assembly is disclosed and is generally indicated by the reference character 110. More particularly, it is seen that the illustrated trigger control mechanism 110 is adapted to be mounted upon a fastener-driving tool 112 which comprises a fastener-driving tool housing 114. A workpiece-contacting element assembly, which comprises a lower workpiece-contacting element 116 and is adapted to be disposed on contact with a workpiece, and an upper workpiece-contacting element linkage member 118 is slidably mounted in a reciprocal manner upon the fastener-driving tool housing 114, and a guide member 120 is fixedly mounted upon the fastener-driving tool housing 114 so as to guide the upper free end distal portion of the upper workpiece-contacting element linkage member 118 during its movement with respect to the trigger control mechanism or assembly 110.

A control valve mechanism or assembly 122 is mounted upon the fastener-driving tool housing 114 so as to initiate either a sequential or contact actuation mode of operation of the fastener-driving tool 112 when the control valve mechanism or assembly 122 is actuated by means of the trigger control mechanism or assembly 110 as will be described below. More particularly, the control valve mechanism or assembly 122 includes a valve member 124 having a valve stem 128 biased by a spring 125 and configured to be seated upon a valve seat 126. The valve stem 128 is configured to be engaged by means of an actuation lever 130 of the trigger control mechanism or assembly 110. The actuation lever 130 is movable between a first or rest position (FIG. 6) and a second or activated position (FIG. 7) and includes a bias member or spring 132 that biases the actuation lever to the rest position. The control valve mechanism 122 also includes an electromagnet or electromagnetic coil 134 disposed around a portion of the valve stem 128 and defines a throughbore 129 configured to receive the valve stem 128 such that the valve stem reciprocally moves within the throughbore of the electromagnet.

Figure 7:
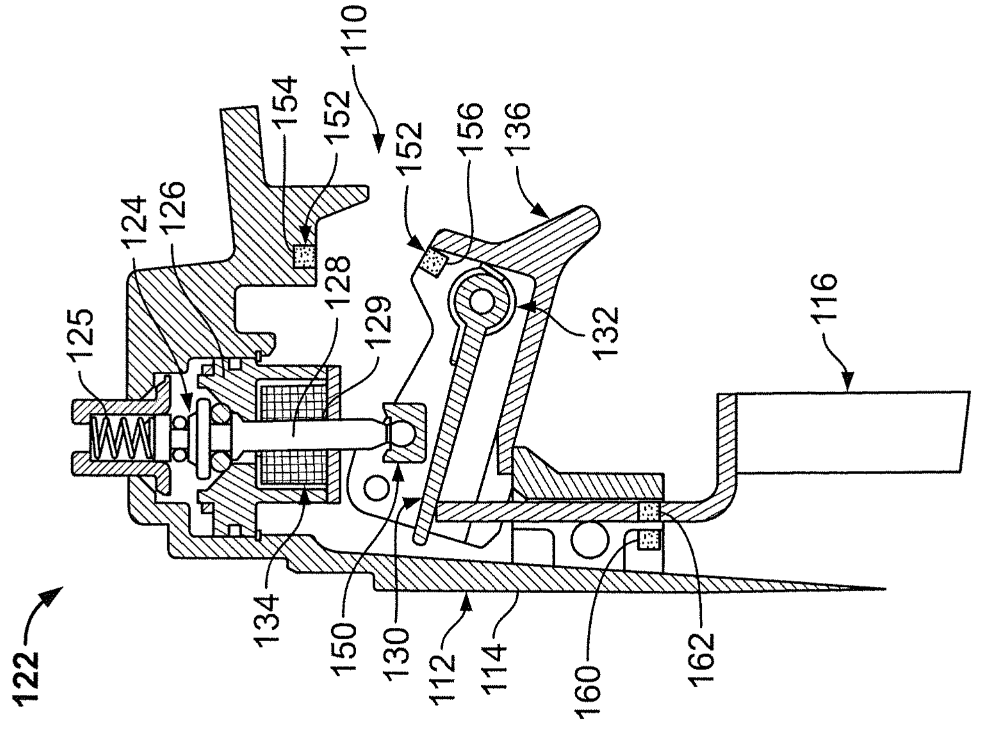
FIG. 7 is a side elevation view of the trigger control mechanism of FIG. 6, wherein the work contact element is in a second or activated position.
Figure 6:
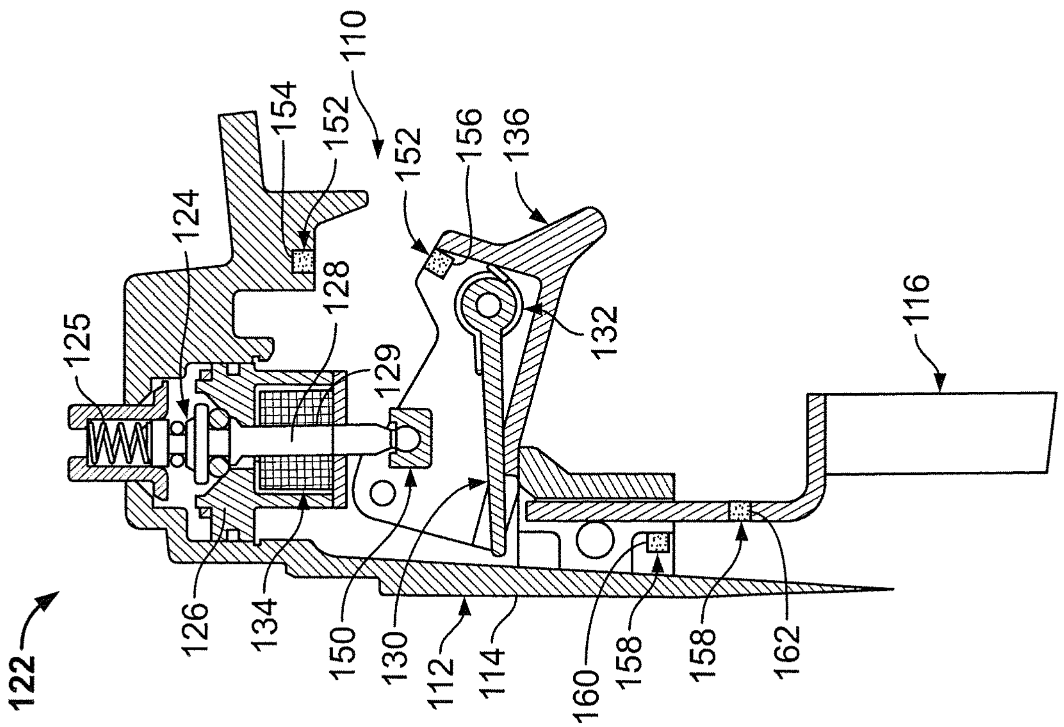
FIG. 6 is a side elevation view of an example of the trigger control mechanism in accordance with an embodiment of the present disclosure, wherein the work contact element is in a first or rest position.

Referring to FIGS. 5-8, the trigger control mechanism or assembly 110 includes a trigger member 136 which essentially comprises a hollow housing structure having a pair of oppositely disposed side walls 138 (FIG. 5) to accommodate the actuation lever 130 and the coil spring 132 components therebetween. More specifically, the trigger member 136 has a throughbore 137 (FIG. 5) extending through the pair of oppositely disposed side walls for accommodating a pivot pin 139 (FIG. 5) for pivotally mounting the actuation lever 130 within the trigger member or trigger 136. Additionally, a swivel member 150 is mounted to an end of the valve stem as shown in FIGS. 6 and 7 and pivots or swivels relative to the end of the valve stem to maintain contact between the swivel member 150 and the actuation lever 130 as the actuation lever pivots and changes position. Alternatively, the swivel member 150 may be mounted to the actuation lever 130 and pivot when the end of the valve stem contacts and engages the swivel member.

A trigger position sensor assembly 152 (FIG. 7) includes a signal generator 156 associated with or on the trigger member and a sensor 154 associated with or on the tool housing for sensing and indicating whether the trigger member is in an activated or non-activated or rest position. In an embodiment, the trigger sensor is a Hall affect sensor that senses a signal generated by the signal generator when the signal is within a designated distance from the sensor. It should be appreciated, however, that a contact sensor or other suitable sensor may be employed as the sensor.

Similarly, a work contact element position sensor assembly or WCE position sensor assembly 158 (FIG. 6) is associated with or mounted on the WCE 116 and the tool housing 114. The WCE position sensor assembly 158, which includes a sensor 160 associated with the housing 114 and a signal generator 162 associated with the workpiece-contacting element, senses and indicates when the WCE 116 is in an activated or non-activated position. Specifically as discussed above, the signal generator 162 generates a signal and the sensor 160 senses the signal when the signal is within a designated distance from the sensor. It should be appreciated that the trigger position sensor assembly 152 and the WCE position sensor assembly 158 are each suitably connected to a controller such as a circuit board for controlling the operation of the tool.

Figure 8:
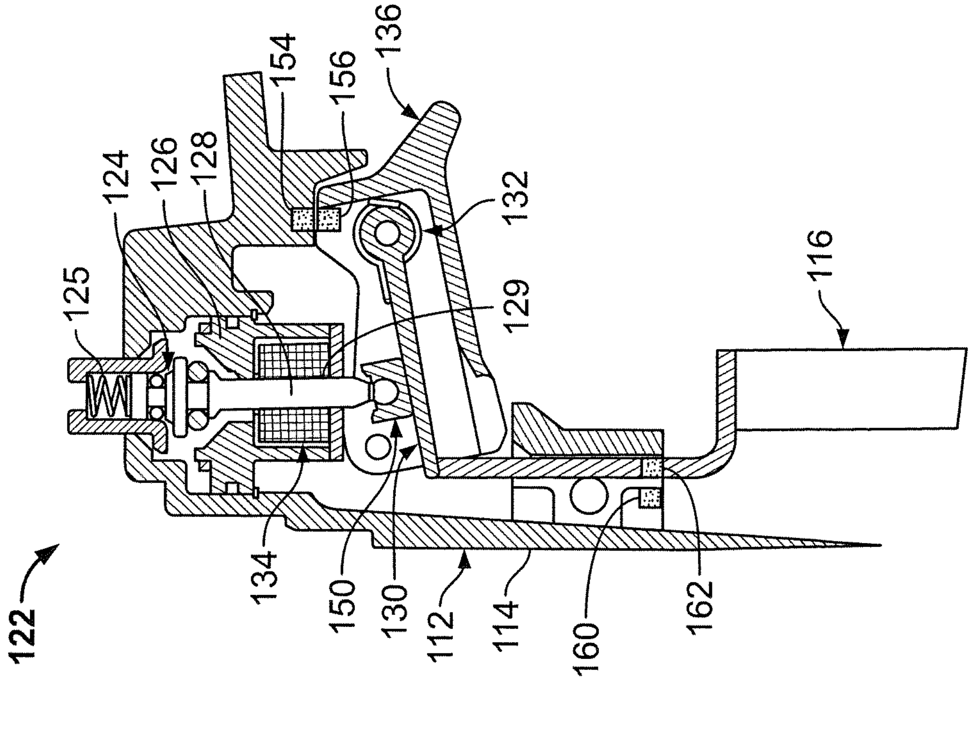
FIG. 8 is a side elevation view of an embodiment of the trigger control mechanism of FIG. 6, wherein the work contact element and the trigger are in the activated positions.

Having described the various structural components comprising the new and improved trigger control mechanism or assembly 110, a brief description of the operation of the same within both of the sequential actuation and contact actuation modes of operation will now be described. With reference initially being made to FIGS. 6-8, the sequential actuation mode of operation will firstly be described.

In the sequential actuation mode or non-powered mode, the electromagnet 134 is not energized and therefore does not hold the trigger 136 in an actuation or activated position. Initially, the trigger 136 and the workpiece-contacting element 116 are in the rest or non-activated positions as shown in FIG. 6. To initiate sequential actuation of the tool, the workpiece-contacting element 116 contacts or is pressed against a workpiece so that the workpiece-contacting element moves upwardly. In the activated position, the sensor 160 on the housing 114 senses a signal generated by the signal generator 162 on the workpiece-contacting element, the actuation lever 130 moves to a position adjacent to the swivel contact member 150 of the valve stem 128 as shown in FIG. 7. To actuate the tool 112 and drive a fastener into a workpiece, the trigger 136 is pressed or moved upwardly until the sensor 154 senses a signal generated by the signal generator 156 on the trigger and the actuation lever 130 contacts and engages the valve stem 128, which indicates that the trigger is in the activated position as shown in FIG. 8. The workpiece-contacting element 116, the actuation lever 130 and the trigger 136 are now in the activated positions to actuate the tool 112 and drive a fastener into the workpiece.

As stated above, the electromagnet 134 of the control valve mechanism 122 is not energized or activated and therefore there is no attraction between the actuation lever 130 and the trigger 136 and the swivel contact member 150. Releasing the trigger 136 causes the spring 132 on the actuation lever 130 to bias the lever to the rest or non-activated position shown in FIG. 6. The above process is then repeated to actuate the tool and to drive another fastener into the workpiece. In the illustrated embodiment, the movement of the first and second signal generators 156 and 162 within a designated distance or pre-determined proximity of the sensors 154 and 160 indicate the relative positions of the workpiece-contacting element 116 and the trigger 136 for actuation of the tool 112. It should be noted that the tool may be operated in the sequential actuation mode or non-powered mode as described above when the tool does not have power, i.e., no battery or dead battery.

Figure 9:
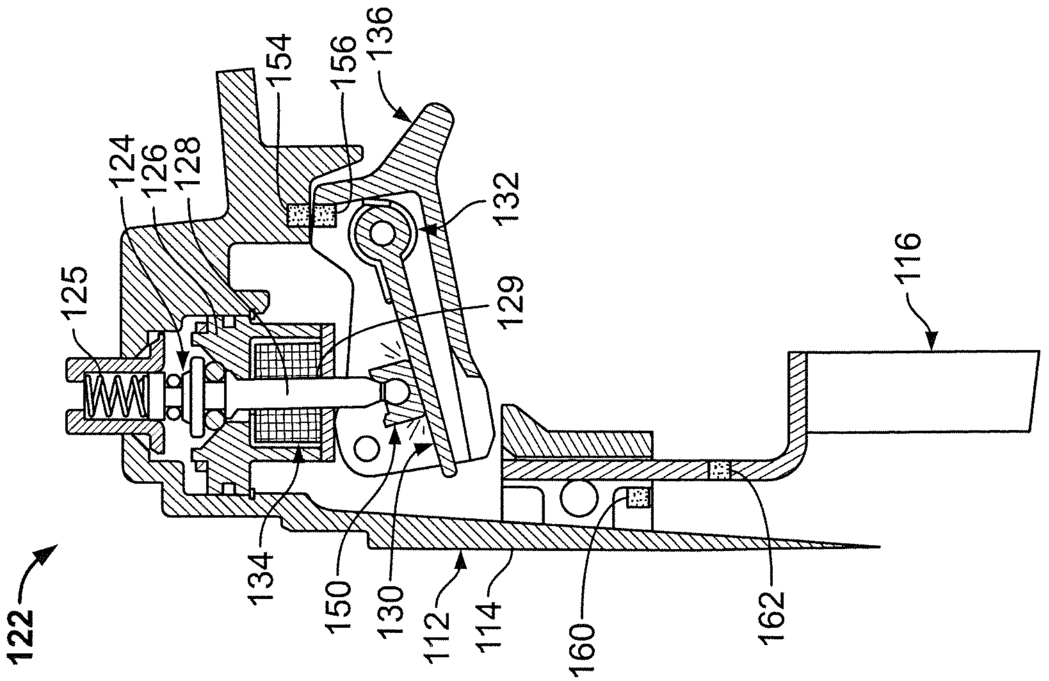
FIG. 9 is a side elevation view of the trigger control mechanism of FIG. 6, wherein the actuation lever remains in contact with the actuation pin and the trigger remains in the activated position while the work contact element returns to the first or rest position.

To initiate contact actuation of the tool, the electromagnet 134 is energized or activated when the trigger 136 is moved to the second or activated position shown in FIG. 9. Energizing the electromagnet 134 causes the actuation lever 130 to be magnetically attracted to the swivel contact member 150. This action holds or secures the actuation lever in a position in which it can be contacted by the workpiece-contacting element 116 each time it engages a workpiece and moves to the activated position, allowing the tool 112 to be actuated and drive a fastener into the workpiece. Thus, the contact actuation or powered mode causes the tool to be actuated in quick succession for driving fasteners along the edge of a board or other similar workpiece.

Figure 10:
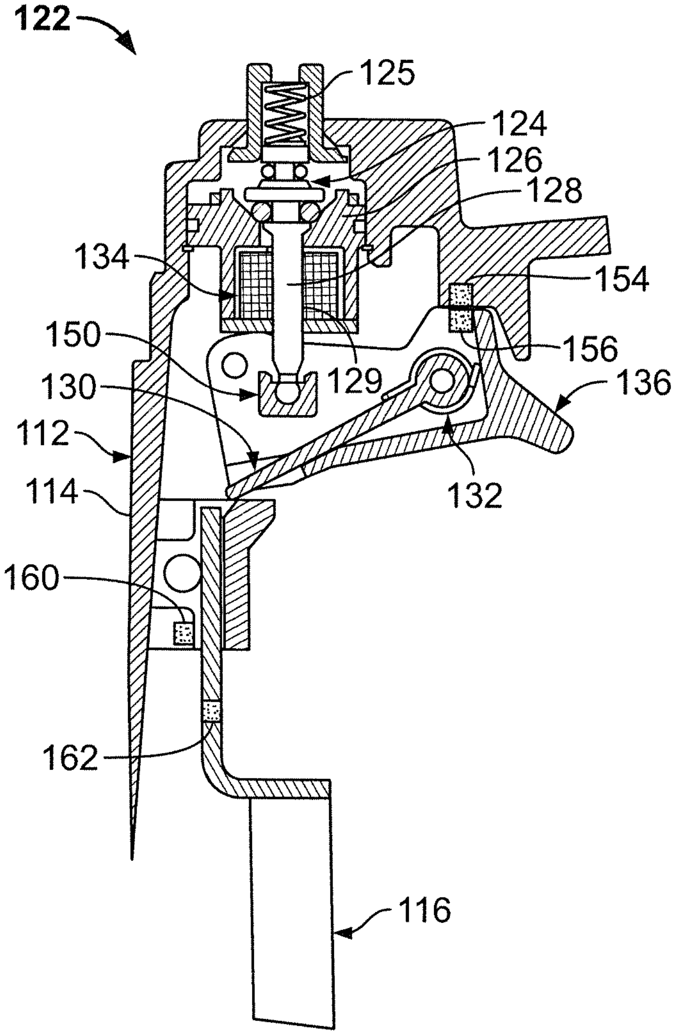
FIG. 10 is a side elevation view of the trigger control mechanism of FIG. 9, wherein the trigger returns to the non-activated or rest position after a designated amount of time has occurred or elapsed while the trigger was in the activated position.
Figure 11:
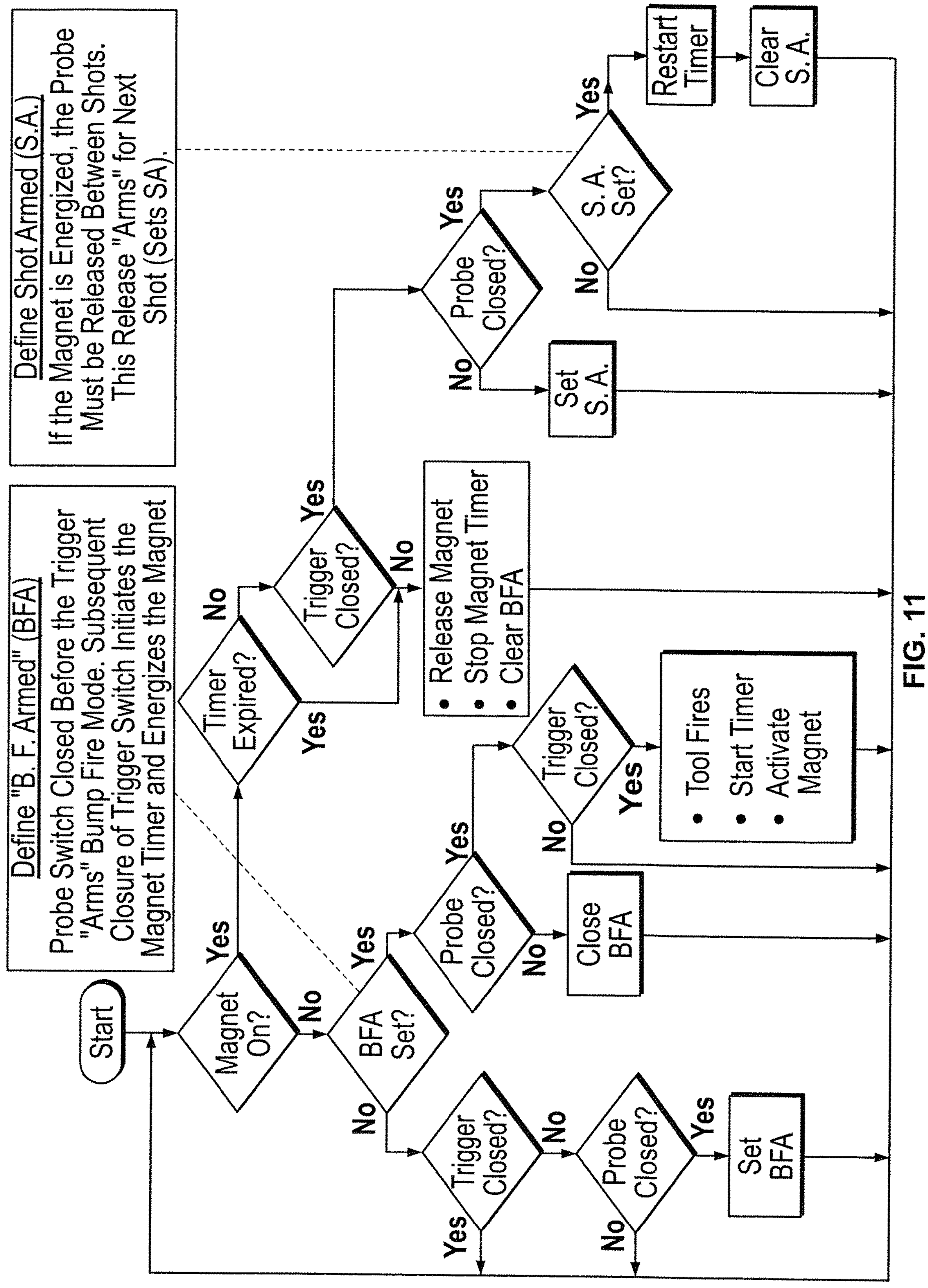
FIG. 11 is a schematic diagram of the operation of the trigger control mechanism shown in FIGS. 1-10.

When the workpiece-contacting element 116, and more specifically, the workpiece-contacting element position sensor assembly 158, is not activated for a designated period of time, or if the trigger 136 is released from its activated position, the electromagnet 134 is de-energized and releases the actuation lever 130 to the rest position due to the biasing force of the spring 132 as shown in FIG. 10. In this embodiment, a timer or other suitable time tracking device is connected to and in communication with the electromagnet 134 so that when the designed time period expires or is reached, the electromagnet is de-energized and the actuation lever 130 moves out of contact with the swivel contact element 150.

Figure 12:
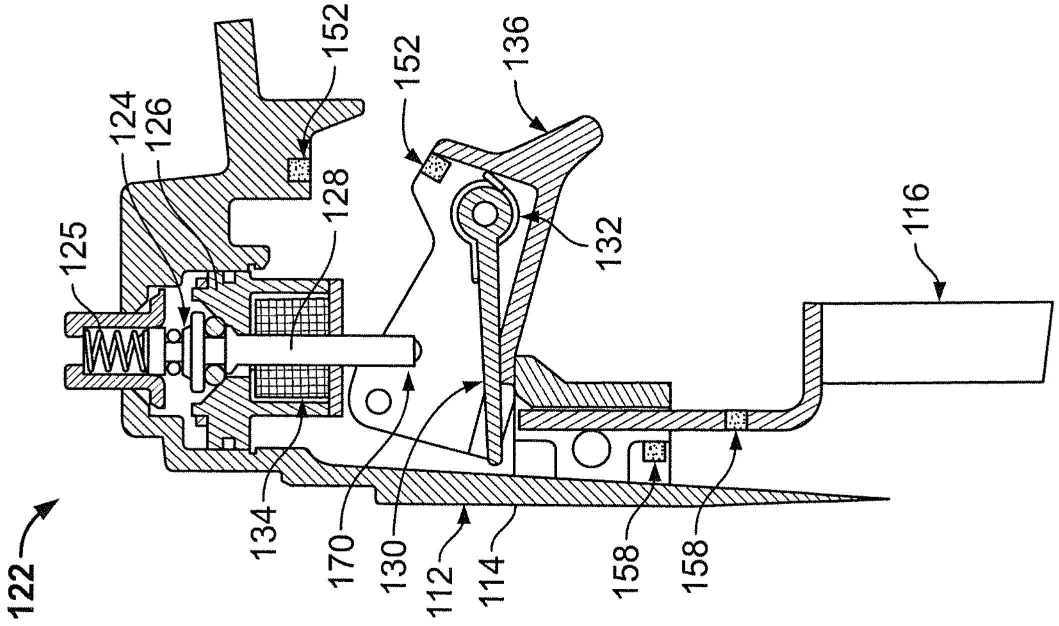
FIG. 12 is a side elevation view of another example trigger control mechanism in accordance with an embodiment of the present disclosure.

Referring now to FIG. 12, another embodiment of the trigger control mechanism 110 is illustrated where the end 170 of the valve stem 128 does not include the swivel contact member. In this embodiment, the end 170 of the valve stem 128 contacts the actuation lever 130 directly when the actuation lever is moved into contact with the end 170 of the valve stem 128 such as when the workpiece-contacting element 116 is moved upwardly due to contact with a workpiece. To maintain sufficient contact between the end 170 of the valve stem 128 and the actuation lever 130, the end 170 of the valve stem 128 is configured to have a shape, such as a conical shape or conical contact surface, which engages and contacts the actuation lever. It should be appreciated that the end 170 of the valve stem 128 may have any suitable shape such as a round shape or any other suitable shape.

Figure 13:
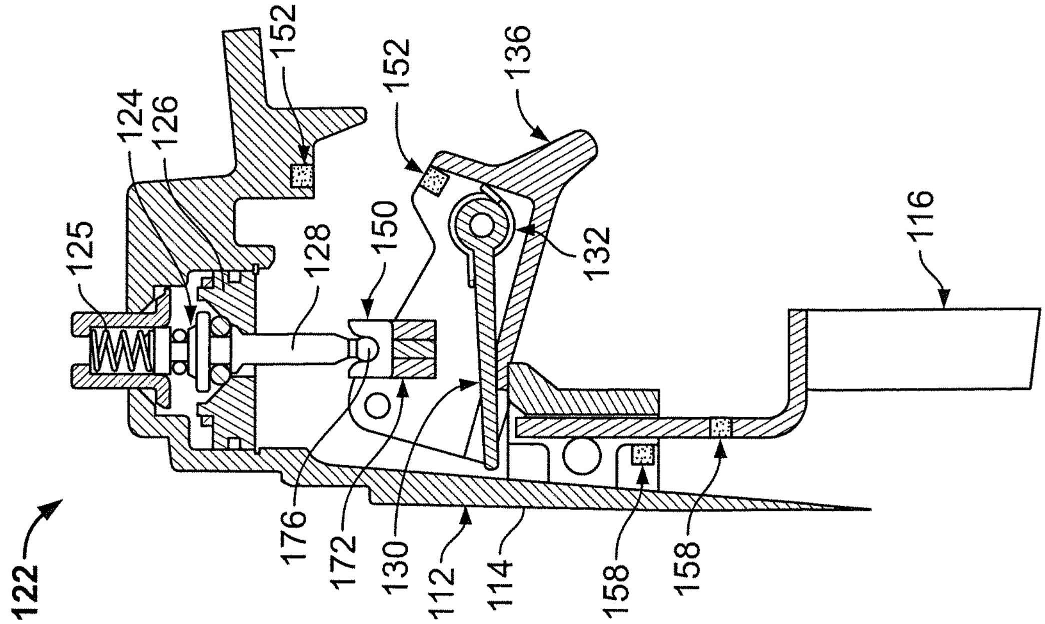
FIG. 13 is a side elevation view of another example trigger control mechanism in accordance with an embodiment of the present disclosure.

Referring now to FIG. 13, another embodiment of the trigger control mechanism 110 is illustrated where an electromagnet 172 is connected to an end 176 of valve stem 128 secured in the swivel contact member 150 thereby enabling the electromagnet to directly contact the actuation lever 130 when the workpiece-contacting element 116 is moved to the activated position. It should be appreciated that the electromagnet or electromagnetic coil 134 on the swivel contact member 150 may be connected to the swivel contact member, surround the swivel contact member or be attached to the swivel contact member using any suitable connection method. It should also appreciated that there may be one or more electromagnets 134 attached to the swivel contact member 150 for varying the magnetic force between the swivel contact member 150 and the actuation lever 130.

Figure 14:
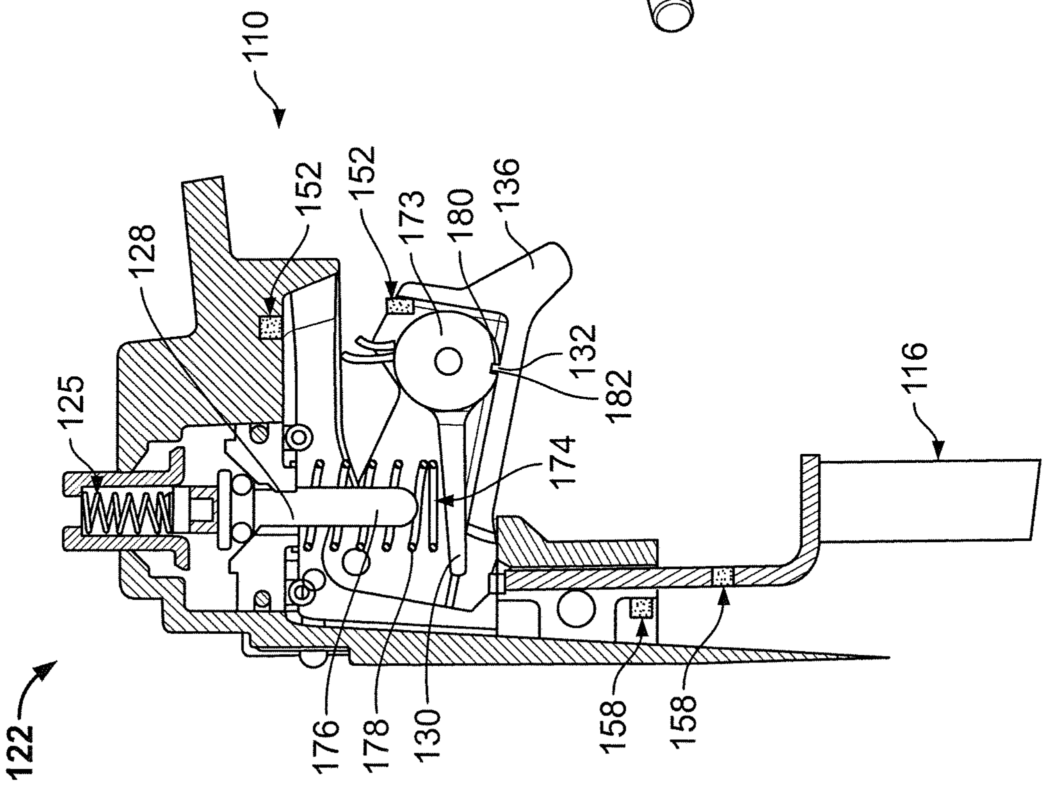
FIG. 14 is a side elevation view of another example trigger control mechanism in accordance with an embodiment of the present disclosure.
Figure 15:
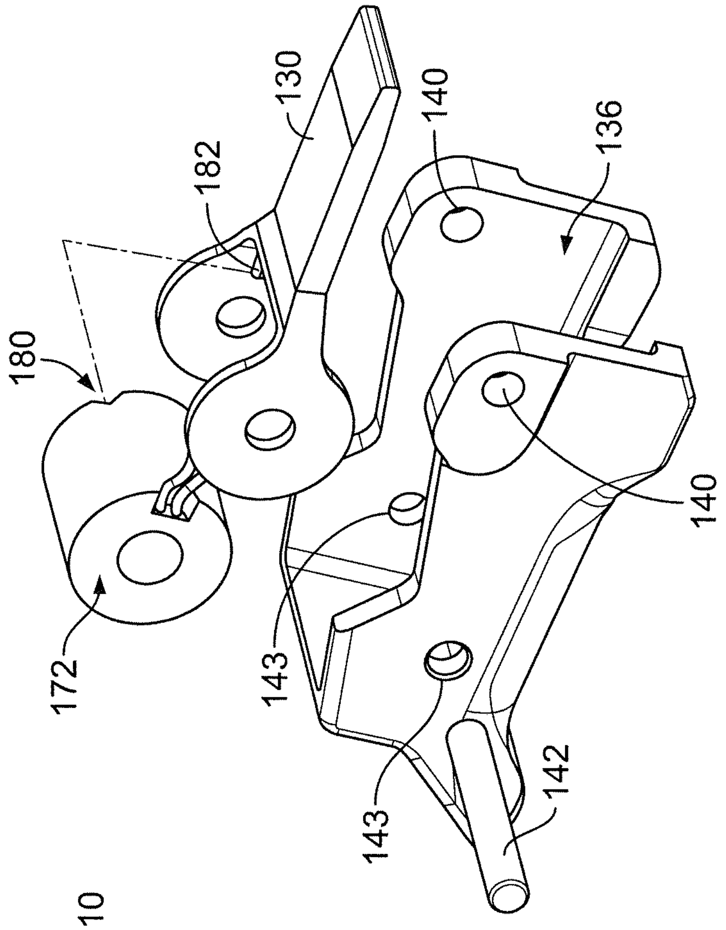
FIG. 15 is an enlarged perspective view of the trigger control mechanism of FIG. 14.

Referring now to FIGS. 14 and 15, a further embodiment of the trigger control mechanism 110 is illustrated where the actuation lever 130 includes an electromagnet or electromagnetic coil 173 that is in communication with a controller such as a circuit board via suitable wires or cables. In the illustrated embodiment, the electromagnet 173 is attached directly to the actuation lever 130 in the trigger 136. The electromagnet 173 includes a groove, notch or indent 180 that matingly engages a protruding lock member 182 on the actuation lever 130 for securing the electromagnet in position relative to the actuation lever. Additionally, a biasing member, such as a coil spring 174, surrounds a portion of the end 176 of the valve stem 128. An end 178 of the spring 174 contacts the actuation lever 130 to bias the actuation lever to the non-activated or rest position shown in FIG. 13. During operation, the electromagnet 173 on the actuation lever 130 is energized when the tool 112 is in the contact actuation or powered mode. Energizing the electromagnet 173 creates a magnetic attraction between the electromagnet 172 and the actuation lever 130 and locks the groove 180 and notch 182 in place thereby holding or securing the actuation lever in a position in which it can be contacted by the workpiece-contacting element 116 each time it engages a workpiece and moves to the activated position. As stated above, the actuation lever 130 remains in a position in which it can be contacted by the workpiece-contacting element 116 until the workpiece-contacting element 116 remains in a non-activated or rest position for a designated period of time or the trigger 136 is released from its activated position.

Figure 17:
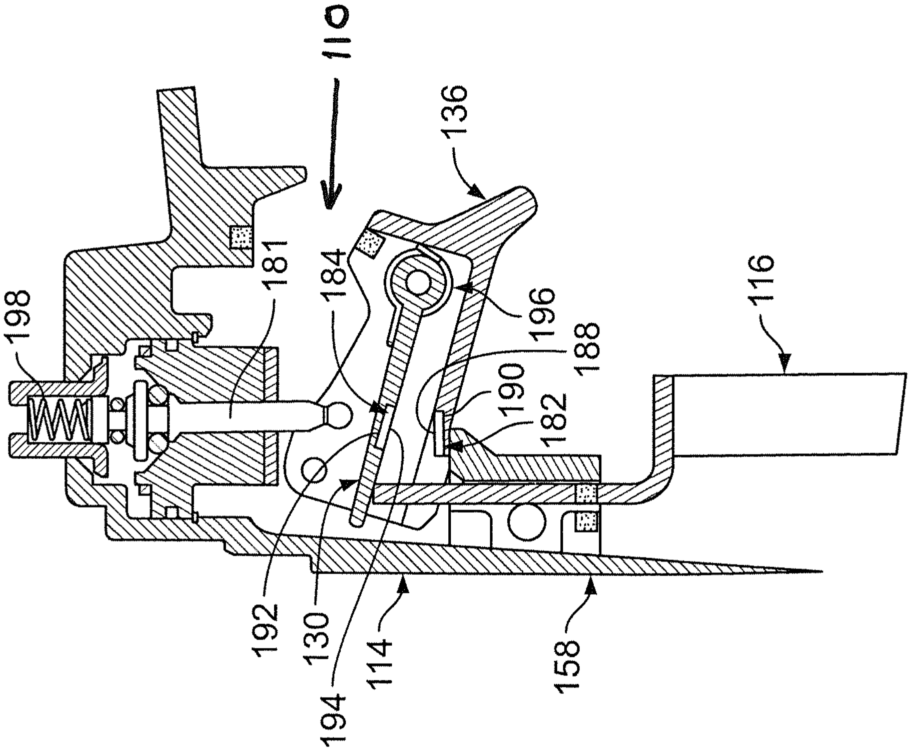
FIG. 17 is a side elevation view of the trigger control mechanism of FIG. 16 where the actuation lever is repelled by a magnet on the bottom surface of the trigger.
Figure 16:
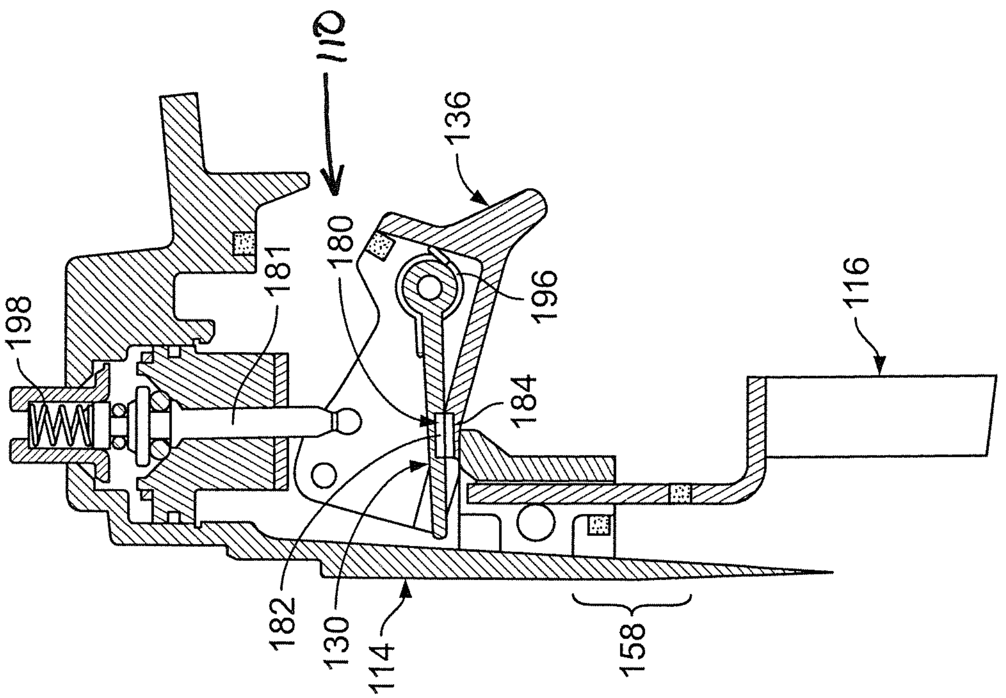
FIG. 16 is a side elevation view of a further example trigger control mechanism in accordance with an embodiment of the present disclosure.
Figure 18:
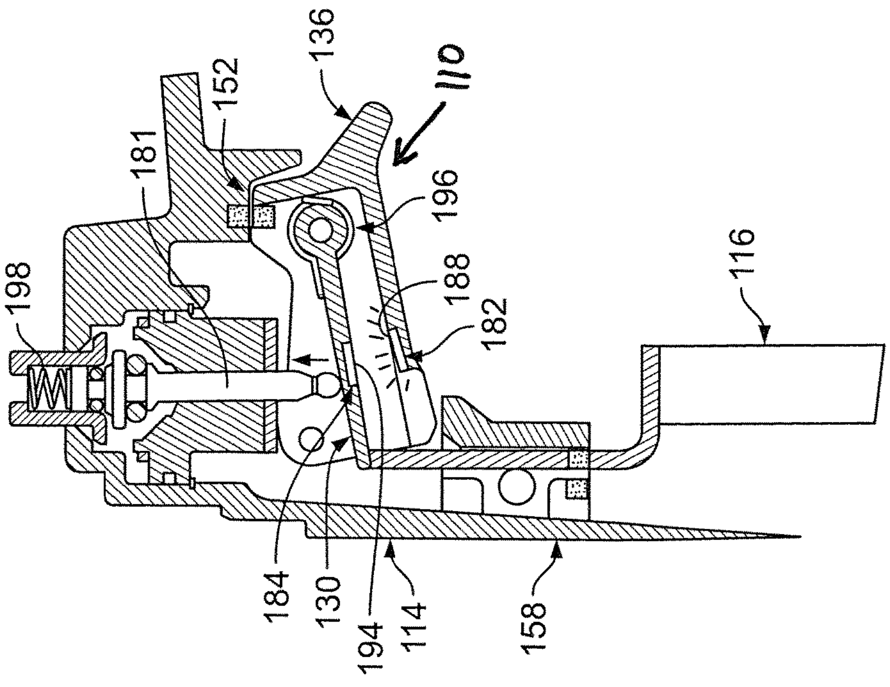
FIG. 18 is a side elevation view of the trigger control mechanism of FIG. 17 where the workpiece-contacting element engages the actuation lever causing the actuation lever to press the actuation pin and initiate an actuation of the tool.

Referring now to FIGS. 16-18, another embodiment of the trigger control mechanism 110 is illustrated where the actuation lever 130 is repelled by a magnet assembly 180 to hold the actuation lever in position next to the actuation pin 181 during contact actuation. Specifically, the magnet assembly 180 includes a permanent magnet 182 on the actuation lever 130, which may be any suitable magnet or a plurality of magnets, and an electromagnet 184 on an inner surface 186 of the trigger 136. It should be appreciated that one or both of the magnets 182 and 184 may be an electromagnet. In the illustrated embodiment, the magnet 182 and the electromagnet 184 are generally aligned with each other so that the permanent magnet is adjacent to the electromagnet when the actuation lever 130 is in a rest position or non-activated position as shown in FIG. 16. More specifically, the magnet 182 and the electromagnet 184 are positioned so that the polarities of adjacent sides of the magnet and electromagnet are the same. For example, a magnet typically has two sides where one side of the magnet has a north or south polarity and the opposing side has an opposite polarity.

Referring to FIG. 17, the top surface or top side 188 of magnet 182 on the actuation lever 130 has a first polarity or south polarity and the inner or bottom side 190 of the magnet has a second polarity or north polarity. Similarly, the top side 192 of the electromagnet 184 has a north polarity and the bottom side 194 has a south polarity when the electromagnet is energized or activated. This causes the same polarities of the magnet 182 and the electromagnet 184, which in this example are the north polarities, to be adjacent to each other as shown in FIG. 16. As is known in the art, magnets or sides of magnets having the same polarity repel or repulse each other. Therefore, when the electromagnet 184 is not energized, the electromagnet does not generate an electromagnetic field, i.e., does not have a first and second polarity, such that the magnet 182 on the actuation lever 130 is not repelled by the electromagnet. As a result, the actuation lever 130 remains in the non-activated or rest position on the inner surface 186 of the trigger 136 due to a biasing force generated by biasing member, such as torsion spring 196, attached to the pivoting end of the actuation lever 130. Conversely, when the electromagnet 184 is energized or activated for contact actuation, the opposing polarities of the magnet 182 and the electromagnet 184 cause the actuation lever 130 to be repelled away from the inner surface 186 of the trigger 136 and against the biasing force of the torsion spring 196 to a position adjacent to an end of the actuation pin 181.

To initiate sequential actuation of the tool, the workpiece-contacting element 116 is pressed on or against a workpiece thereby causing it to move upwardly within the tool housing 114 so that it contacts and pushes the actuation lever 130 upwardly and away from the inner surface 186 of the trigger 136. The tool is then actuated by pressing the trigger 136 inwardly causing the actuation lever 130 to contact and press the actuation pin 181 inwardly. This sequence is repeated for each sequential actuation of the tool.

To initiate contact actuation of the tool, the electromagnet 184 is energized causing the actuation lever 130, and more specifically, the magnet 182 on the actuation lever to be repelled by the electromagnetic field generated by the electromagnet 184 against the biasing force of torsion spring 196. The actuation lever 130 is held in position next to the actuation pin 181 while the electromagnet 184 is energized. In this position shown in FIG. 17, the actuation lever 130 can be quickly and repeatedly contacted by the workpiece-contacting element 116 each time the workpiece-contacting element engages a workpiece thereby causing the actuation of the tool and driving a fastener into the workpiece.

As described above, when the workpiece-contacting element 116, and more specifically, the workpiece-contacting element position sensor assembly 158, is not activated for a designated period of time, or if the trigger 136 is released from its activated position as sensed by the trigger position sensor 152, the electromagnet 184 is de-energized which causes the actuation lever 130 to return the rest position due to the biasing force of the torsion spring 196 as shown in FIG. 16. Further, a timer or other suitable time tracking device is connected to and in communication with the electromagnet 184 so that when a programmed designed time period expires or is reached, the electromagnet is de-energized and the actuation lever 130 returns to the rest position.

Figure 19:
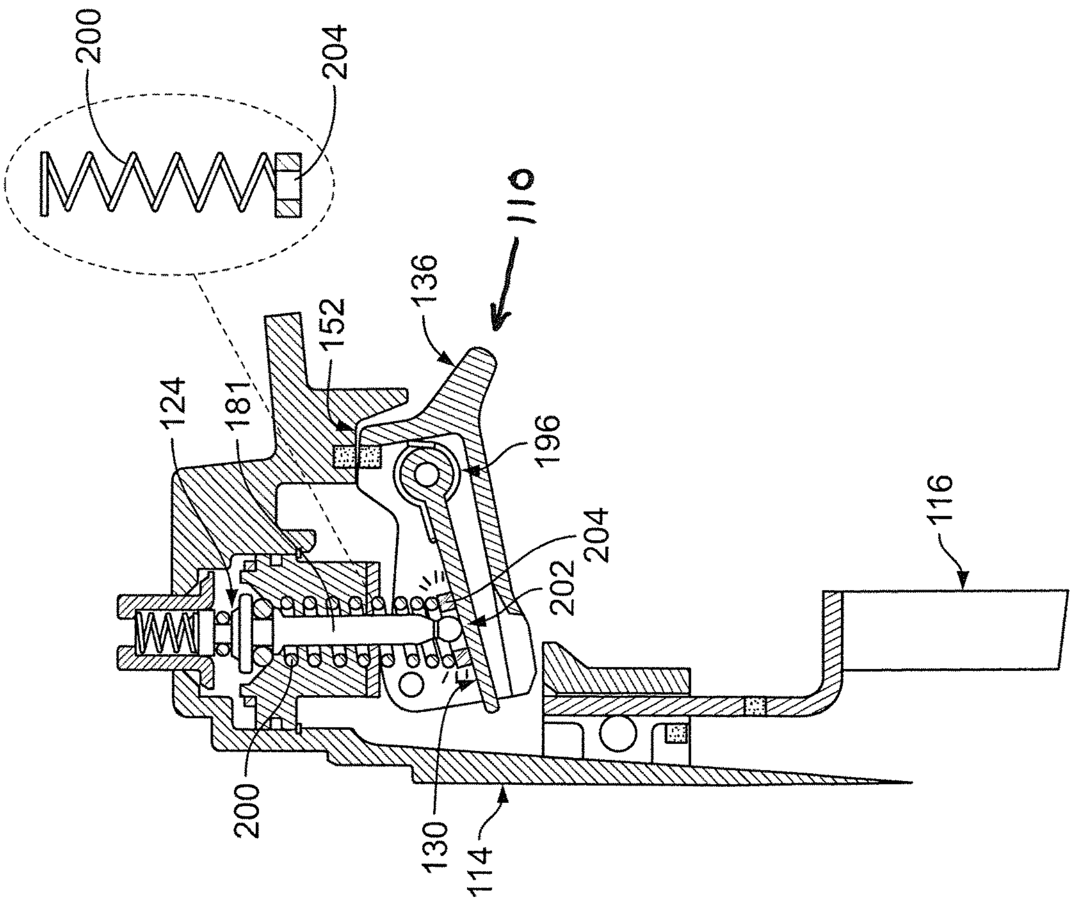
FIG. 19 is a side elevation view of another example trigger control mechanism in accordance with an embodiment of the present disclosure.

Referring now to FIG. 19, a further embodiment of the trigger control mechanism 110 is illustrated where the valve member 124 includes a biasing member, such as coil spring 200, connected to the valve member and surrounding the actuation pin 181. An outer end 202 of the coil spring 200 includes an electromagnet 204 where the flexibility of the coil spring allows the electromagnet to pivot relative to the actuation lever 130. During sequential operation of the tool, the workpiece-contacting element 116 is pressed against a workpiece causing the end of workpiece contacting element to contact and move the actuation lever 130 to a position adjacent to the actuation pin 181. The trigger 136 is then pressed inwardly to engage the actuation pin 181 and initiate an actuation of the tool.

When the workpiece-contacting element sensor 158 senses that the workpiece-contacting element 116 is pressed against a workpiece as shown in FIG. 17, and the trigger position sensor 152 senses that the trigger 136 has been pulled inwardly to the actuated position as shown in FIG. 19, the processor in the tool initiates contact actuation. In contact actuation, the electromagnet 204 is energized which attracts and holds the actuation lever 130 at a position adjacent to the actuation pin 181. Specifically, the electromagnet 204 pivots to be substantially flush with a surface of the actuation lever 130, which forms a strong magnetic bond with the actuation lever to securely hold the actuation lever in position during contact actuation. When the trigger 136 is released or after the pre-determined amount of time has passed without an actuation of the tool, the electromagnet 204 is de-energized thereby eliminating the attraction with the actuation lever 130 and allowing the actuation lever to separate from the electromagnet and return to the rest position due to the biasing force of torsion spring 196, which reverts the tool back to sequential actuation. In this way, the tool can still be operated in the sequential actuation mode even when the battery is not charged or there is no charge remaining to activate the electromagnet 204.

Figure 21:
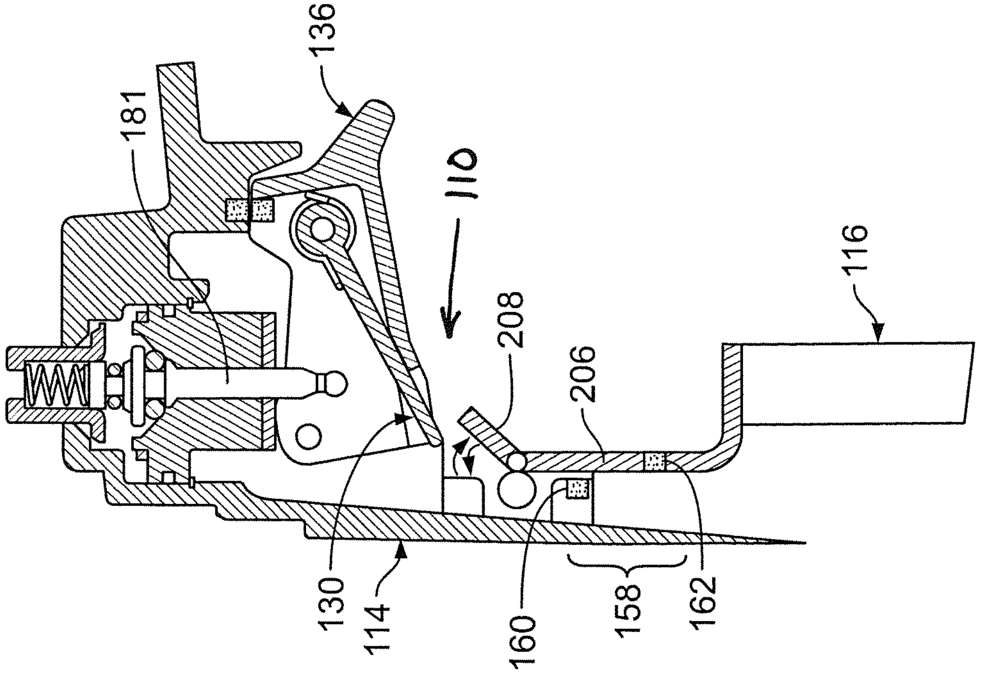
FIG. 21 is a side elevation view of the trigger control mechanism of FIG. 20 where the end portion of the workpiece-contacting element is in the second position.
Figure 20:
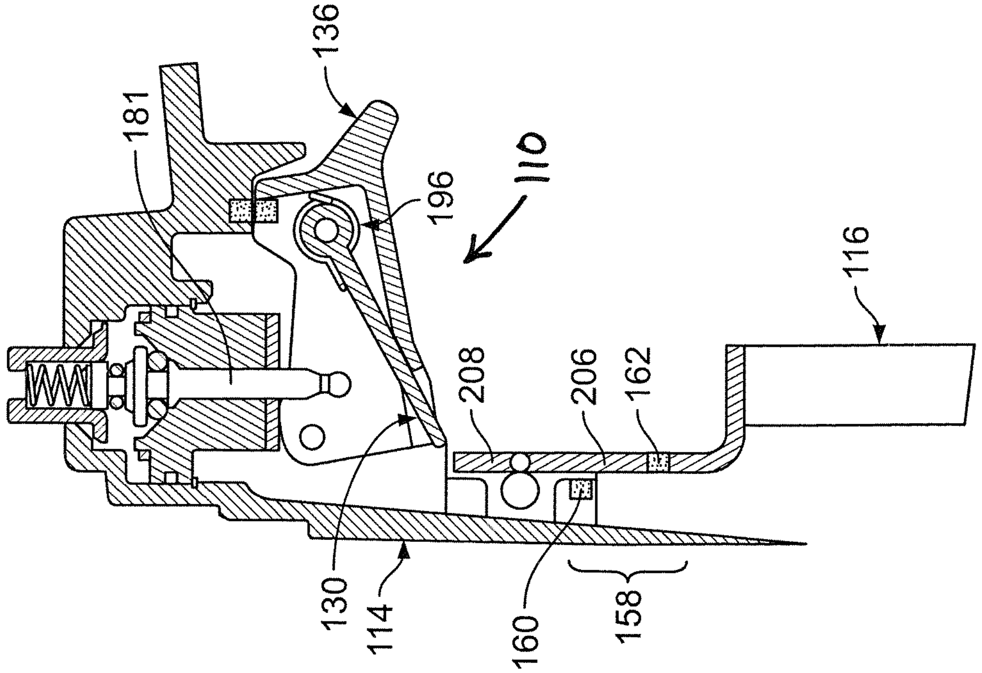
FIG. 20 is a side elevation view of a further example trigger control mechanism in accordance with an embodiment of the present disclosure where the end portion of the workpiece-contacting element is in the first position.
Figure 22:
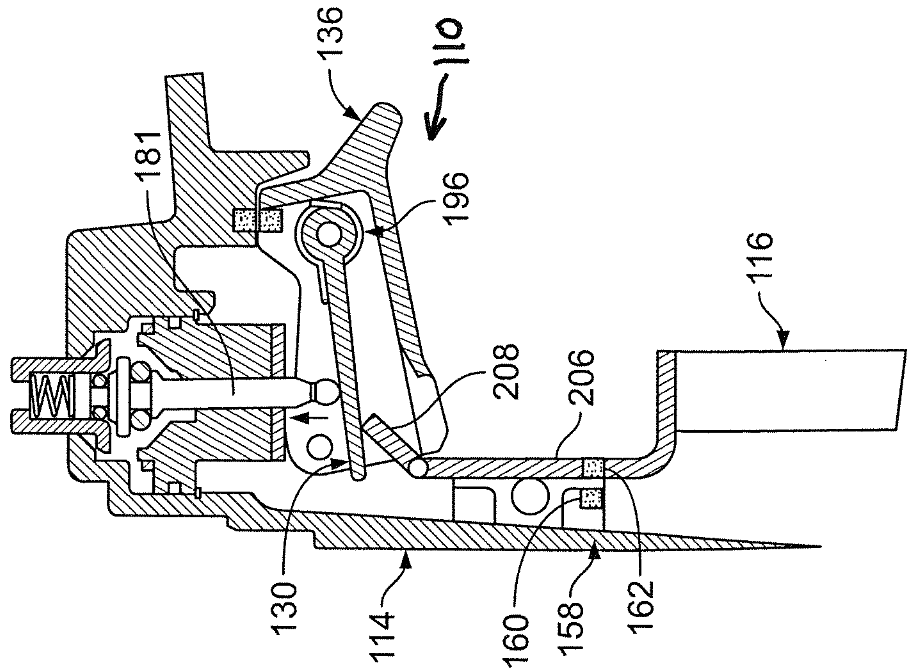
FIG. 22 is a side elevation view of the trigger control mechanism of FIG. 21 where the end portion of the workpiece-contacting element is in the second position and engages the actuation lever to initiate an actuation of the tool.

Referring now to FIGS. 20-22, another embodiment of the trigger control mechanism 110 is illustrated where the workpiece-contacting element 116 includes a fixed portion 206 and an end portion 208 pivotably connected to the fixed portion. The end portion 208 is in communication with a controller or processor in the tool, which sends a signal to the end portion to move or pivot from a first position (FIG. 20) to a second position (FIG. 21) based on whether the tool is in the sequential actuation mode or the contact actuation mode. It should be appreciated that the end portion 208 may be moved by non-electrical means such as pneumatically by using air pressure generated in the cylinder to move the end portion or any other suitable method.

In the sequential actuation mode, the end portion 208 is in the first position where it is vertically oriented and generally aligned with the fixed portion 206. When a user presses the tool, and more specifically, the workpiece-contacting element 116 against a workpiece, the workpiece-contacting element 116 moves inwardly relative to the housing 114 until the workpiece-contacting element sensor 158, and more specifically, the workpiece-contacting element contacts 160, 162 are aligned as described above. The user then presses the trigger 136 inwardly so that the actuation lever 130 contacts the actuation pin 181 to initiate actuation and driving of a fastener into a workpiece.

In the contact actuation mode, the processor sends a signal to the end portion 208 to pivot or rotate a predetermined distance so that the end portion is at a designated angle relative to the fixed portion 206. When the end portion 208 is in the second or angled position, and the trigger 136 is depressed, the angled end portion 208 contacts the actuation lever 130 and moves it against the actuation pin 181 to initiate actuation of the tool. The tool will then be actuated each time the workpiece-contacting element 116 is depressed against a workpiece while in the contact actuation mode. As stated above, the end portion 208 moves back to its original vertically oriented rest position in alignment with the fixed portion 206, when the trigger 136 is released or when a predetermined amount of time has elapsed without actuation of the tool.

Figure 23:
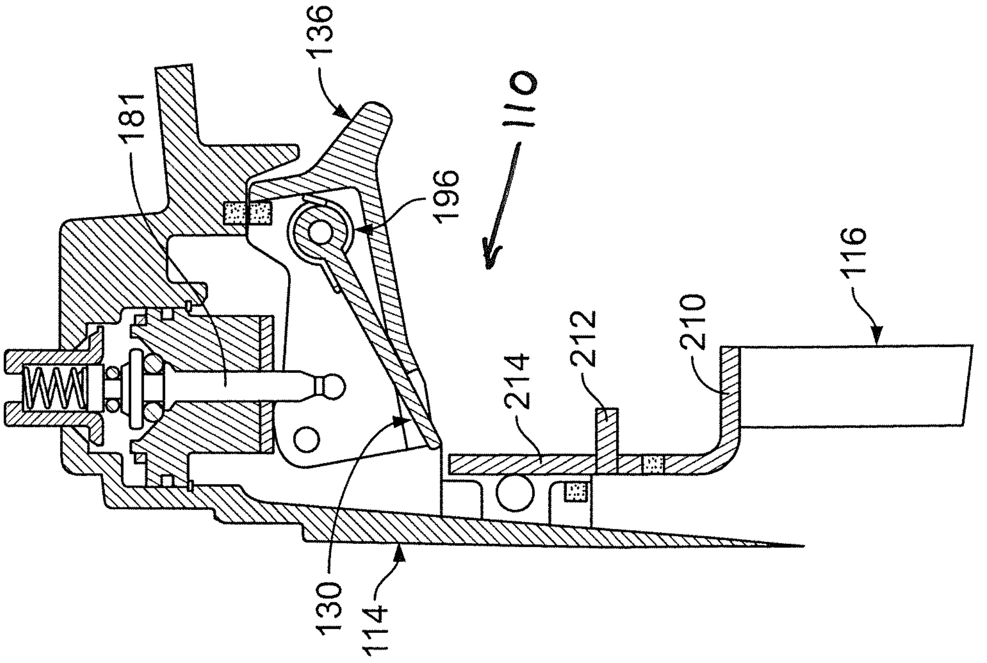
FIG. 23 is a side elevation view of another example trigger control mechanism in accordance with an embodiment of the present disclosure where the end portion of the workpiece-contacting element is in the first position.
Figure 25:
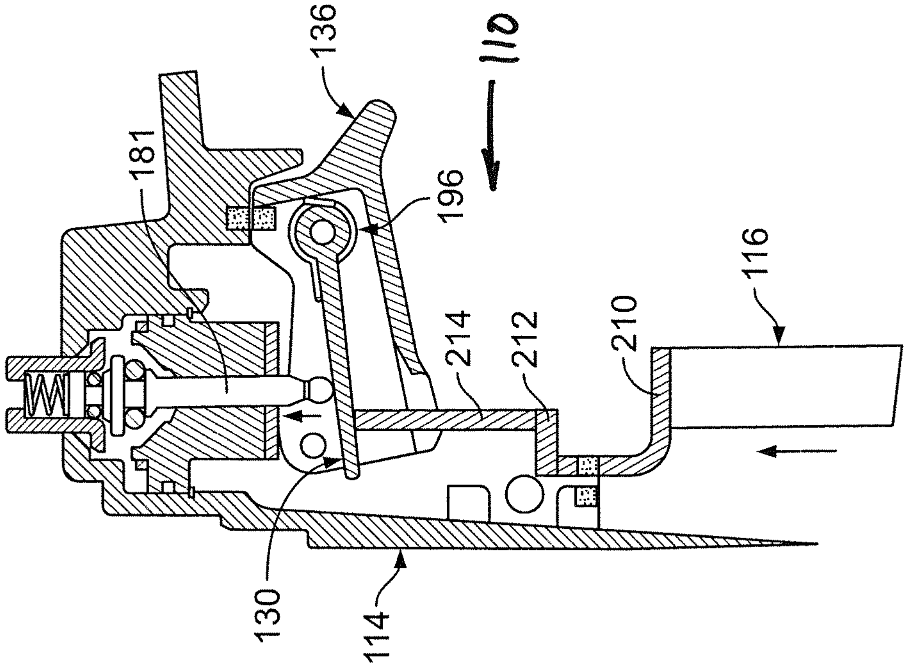
FIG. 25 is a side elevation view of the trigger control mechanism of FIG. 24 where the end portion of the workpiece-contacting element is in the second position and engages the actuation lever to initiate an actuation of the tool.
Figure 24:
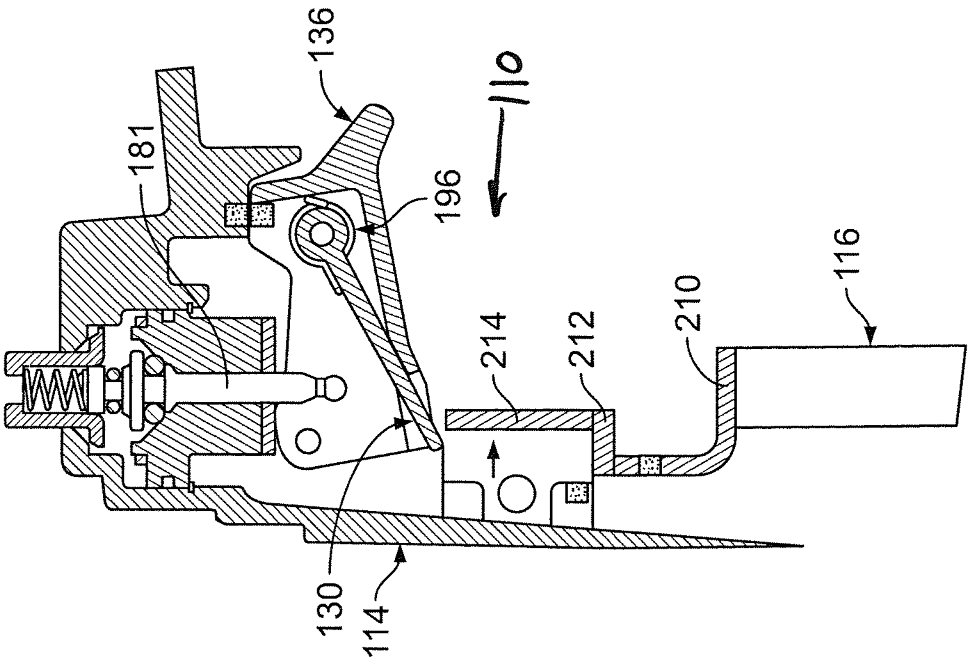
FIG. 24 is a side elevation view of the trigger control mechanism of FIG. 23 where the end portion of the workpiece-contacting element is in the second position.

Referring now to FIGS. 23-25, a further embodiment of the trigger control mechanism 110 is illustrated where the workpiece-contacting element 116 includes a fixed portion 210, a transverse guide member 212 connected to the fixed portion and an end portion 214 movably connected to the guide member such that the end portion moves or slides along the guide member between a first position (FIG. 23), where the end portion is generally vertically aligned with the fixed portion, and a second position (FIG. 24), where the end portion is offset from the fixed portion.

In the sequential operation mode, the end portion 214 is in the first position near an end of the actuation lever 130 so that when the trigger 136 is in the rest or non-activated position, the workpiece-contacting element 116 only contacts the actuation lever 130 when the workpiece-contacting element is depressed against a workpiece. Thus when the end portion is in the first position shown in FIG. 23, the tool is in the sequential actuation mode and is actuated each time the workpiece-contacting element 116 is pressed against the workpiece and the trigger 136 is pressed inwardly, i.e., activated.

To initiate the bump fire or contact actuation mode, the processor sends a signal to the workpiece-contacting element 116, and more specifically, to the end portion 214 that causes the end portion to move to the second position or offset position. In the second position, the end portion 214 is positioned adjacent to a central portion of the actuation lever 130 such that it will contact the actuation lever 130. More specifically, in this position, each time the workpiece-contacting element 116 is pressed against a workpiece, the workpiece-contacting element moves upwardly into the housing 114 and pushes the actuation lever 130 against the actuation pin 181 to initiate actuation of the tool and drive a fastener. The end portion 214 of the workpiece-contacting element 116 remains in the second position until the user releases the trigger 136 or a predetermined amount of time has elapsed without actuation of the tool as described above.

Figure 27:
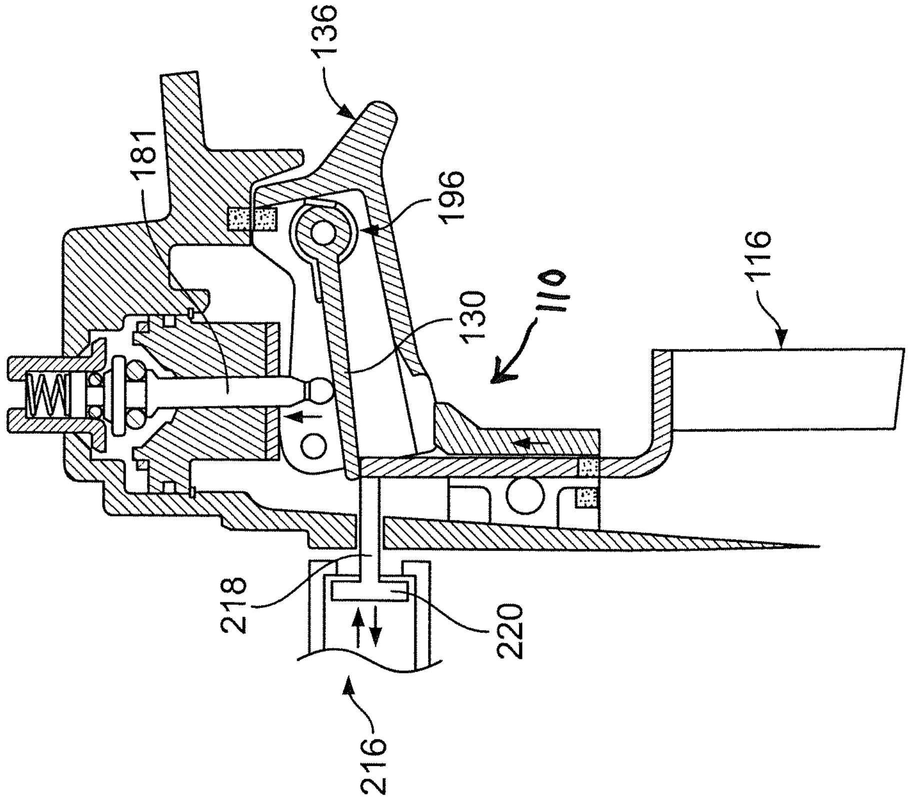
FIG. 27 is a side elevation view of the trigger control mechanism of FIG. 26 where the workpiece-contacting element has engaged the actuation lever to initiate an actuation of the tool.
Figure 26:
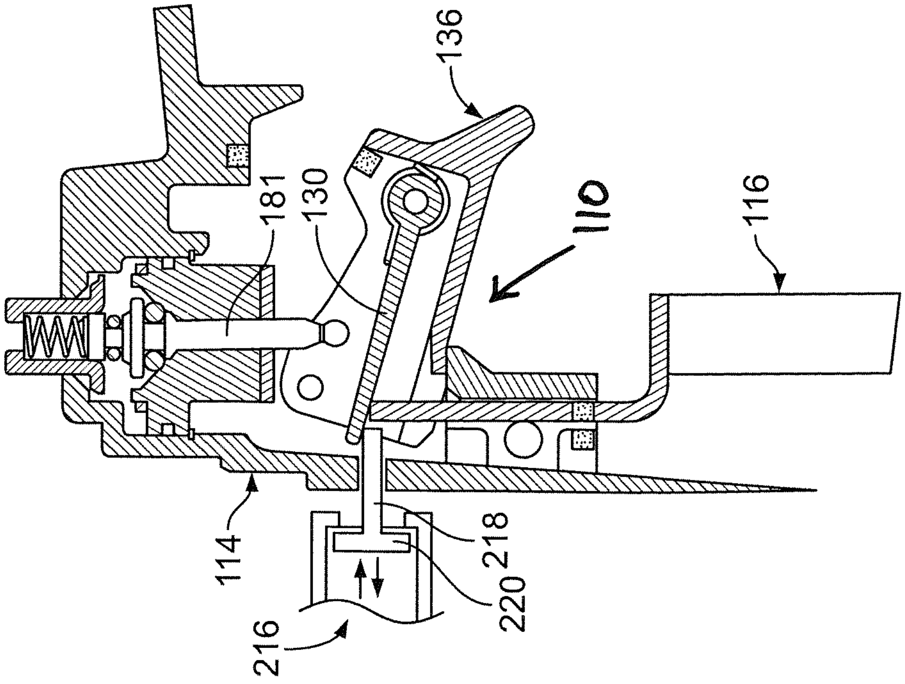
FIG. 26 is a side elevation view of a further example trigger control mechanism in accordance with an embodiment of the present disclosure where an end of a reciprocating pin is engaged with the actuation lever.

Referring now to FIGS. 26-27, another embodiment of the trigger control mechanism 110 is illustrated where the actuation lever 130 is held in the bump actuation or contact actuation position by a pin assembly 216 having a reciprocating pin 218. The pin 218 may be part of a reciprocating piston 220 as shown in FIG. 22 that is moved by pressurized air supplied from an internal air source, air forced out of the cylinder of the tool during actuation of the tool or by any other suitable method. In the illustrated embodiment, the pin 218 is in communication with the processor which moves the pin based on whether the tool is in the sequential mode or the contact actuation mode. In the sequential actuation mode, the pin 218 is retracted or not in contact with the actuation lever 130 thereby allowing the actuation lever to move between the rest position and the actuation position. In this mode, the workpiece-contacting element 116 is pressed against a workpiece and the trigger 136 is pressed inwardly to initiate actuation of the tool and drive a fastener. These steps are repeated for each independent or sequential actuation of the tool.

In the contact actuation mode, the pin 218 moves to the second position, which is generally at least partially beneath and in contact with the actuation lever 130 to hold the actuation lever in the activated position. In this position, the trigger 136 is pressed inwardly so that each time the workpiece-contacting element 116 is pressed against a workpiece, the tool is actuated and a fastener is driven into the workpiece. Subsequent actuations of the tool are initiated each time the workpiece-contacting element 116 is pressed against the workpiece. The actuation lever 130 returns to the sequential actuation mode when a user releases the trigger 136 or when a designated amount of time has elapsed without an actuation of the tool as described above. At such time, the processor sends a signal to move the piston 220, and more specifically, the pin 218, to the first position which is away from and out of contact with the actuation lever 130 thereby resetting the actuation mode of the tool by releasing the actuation lever to move back to the rest position.

While particular embodiments of a powered fastener-driving tool have been described herein, it will be appreciated by those skilled in the art that changes and modifications may be made thereto without departing from the invention in its broader aspects and as set forth in the following claims.

The invention claimed is:

1. A method of operating a fastener-driving tool including a housing, a processor supported by the housing, a trigger supported by the housing and movable from a rest position to an activating position, an electromagnet supported by the housing, and a workpiece-contact element supported by the housing and movable from an extended position to a retracted position, said method comprising:

in a sequential actuation mode for the fastener-driving tool, responsive to movement of the workpiece-contact element from the extended position to the retracted position and subsequent movement of the trigger from the rest position to the activating position, causing the fastener-driving to drive one of a plurality of fasteners;

in the sequential actuation mode for the fastener-driving tool, responsive to an occurrence of a contact actuation mode triggering condition, automatically causing, via the processor, the fastener-driving tool to be in a contact actuation mode and which includes activating, via the processor, the electromagnet to automatically cause the fastener-driving tool to be in the contact actuation mode;

in the contact actuation mode for the fastener-driving tool, responsive to movement of the workpiece-contact element from the extended position to the retracted position, causing the fastener-driving to drive one of the plurality of fasteners; and in the contact actuation mode for the fastener-driving tool, responsive to an occurrence of a release condition, automatically causing, via the processor, the fastener-driving tool to return to the sequential actuation mode.

2. The method of claim 1, which includes de-activating, via the processor, the electromagnet to cause the fastener-driving tool to return to the sequential actuation mode.

3. The method of claim 1, wherein the electromagnet is coupled to the trigger.

4. The method of claim 3, which includes de-activating, via the processor, the electromagnet to cause the fastener-driving tool to return to the sequential actuation mode.

5. The method of claim 1, wherein the fastener-driving tool includes an actuation lever supported by the housing, and which includes activating, via the processor, the electromagnet to control the actuation lever to cause the fastener-driving tool to be in the contact actuation mode.

6. The method of claim 5, which includes de-activating, via the processor, the electromagnet and the actuation lever to cause the fastener-driving tool to return to the sequential actuation mode.

7. The method of claim 1, wherein the fastener-driving tool includes a control valve supported by the housing, and which includes activating, via the processor, the electromagnet to control the control valve to cause the fastener-driving tool to be in the contact actuation mode.

8. The method of claim 7, which includes de-activating, via the processor, the electromagnet to cause the fastener-driving tool to return to the sequential actuation mode.

9. The method of claim 1, wherein the contact actuation mode triggering condition includes the trigger being depressed into the activating position.

10. The method of claim 1, wherein the fastener-driving tool includes a trigger position sensor supported by the housing, and wherein the contact actuation mode triggering condition includes a signal from the trigger position sensor.

11. The method of claim 1, wherein the fastener-driving tool includes a trigger position sensor supported by the housing, and wherein the contact actuation mode triggering condition includes the trigger position sensor sensing that the trigger has been depressed to the activating position.

12. The method of claim 1, wherein the release condition includes the fastener-driving tool being in the contact actuation mode for a designated period of time without the movement of the workpiece-contact element from the extended position to the retracted position.

13. The method of claim 1, wherein the fastener driving tool includes a workpiece-contacting element position sensor supported by the housing, and wherein the release condition includes a signal from the workpiece-contacting element position sensor.

14. The method of claim 1, wherein the fastener driving tool includes a workpiece-contacting element position sensor supported by the housing, and wherein the release condition includes the workpiece-contacting element position sensor sensing that the workpiece-contact element has not moved from the extended position to the retracted position for a designated period of time.

15. A method of operating a fastener-driving tool including a housing, a processor supported by the housing, a trigger supported by the housing and movable from a rest position to an activating position, an electromagnet supported by the housing, and a workpiece-contact element supported by the housing and movable from an extended position to a retracted position, said method comprising:

in a sequential actuation mode for the fastener-driving tool, responsive to movement of the workpiece-contact element from the extended position to the retracted position and subsequent movement of the trigger from the rest position to the activating position, causing the fastener-driving to drive one of a plurality of fasteners;

in the sequential actuation mode for the fastener-driving tool, responsive to an occurrence of a contact actuation mode triggering condition, automatically causing, via the processor, the fastener-driving tool to be in a contact actuation;

in the contact actuation mode for the fastener-driving tool, responsive to movement of the workpiece-contact element from the extended position to the retracted position, causing the fastener-driving to drive one of the plurality of fasteners; and in the contact actuation mode for the fastener-driving tool, responsive to an occurrence of a release condition, automatically causing, via the processor, the fastener-driving tool to return to the sequential actuation mode, and which includes de-activating, via the processor, the electromagnet to cause the fastener-driving tool to be in the sequential actuation mode.

16. A method of operating a fastener-driving tool including a housing, a processor supported by the housing, a trigger supported by the housing and movable from a rest position to an activating position, and a workpiece-contact element supported by the housing and movable from an extended position to a retracted position, said method comprising:

in a sequential actuation mode for the fastener-driving tool, responsive to movement of the workpiece-contact element from the extended position to the retracted position and subsequent movement of the trigger from the rest position to the activating position, causing the fastener-driving to drive one of a plurality of fasteners;

in the sequential actuation mode for the fastener-driving tool, responsive to an occurrence of a contact actuation mode triggering condition including the trigger being depressed into the activating position, automatically causing, via the processor, the fastener-driving tool to be in a contact actuation mode;

in the contact actuation mode for the fastener-driving tool, responsive to movement of the workpiece-contact element from the extended position to the retracted position, causing the fastener-driving to drive one of the plurality of fasteners; and in the contact actuation mode for the fastener-driving tool, responsive to an occurrence of a release condition, automatically causing, via the processor, the fastener-driving tool to return to the sequential actuation mode.

17. A method of operating a fastener-driving tool including a housing, a processor supported by the housing, a trigger supported by the housing and movable from a rest position to an activating position, and a workpiece-contact element supported by the housing and movable from an extended position to a retracted position, said method comprising:

in a sequential actuation mode for the fastener-driving tool, responsive to movement of the workpiece-contact element from the extended position to the retracted position and subsequent movement of the trigger from the rest position to the activating position, causing the fastener-driving to drive one of a plurality of fasteners;

in the sequential actuation mode for the fastener-driving tool, responsive to an occurrence of a contact actuation mode triggering condition, automatically causing, via the processor, the fastener-driving tool to be in a contact actuation mode;

in the contact actuation mode for the fastener-driving tool, responsive to movement of the workpiece-contact element from the extended position to the retracted position, causing the fastener-driving to drive one of the plurality of fasteners; and in the contact actuation mode for the fastener-driving tool, responsive to an occurrence of a release condition, automatically causing, via the processor, the fastener-driving tool to return to the sequential actuation mode, wherein the release condition includes the fastener-driving tool being in the contact actuation mode for a designated period of time without the movement of the workpiece-contact element from the extended position to the retracted position.

* * * * *